United States Patent [19]

Kovacs et al.

[11] Patent Number: 4,916,470
[45] Date of Patent: Apr. 10, 1990

[54] IMAGE BAR WITH ELECTROCHROMIC SWITCHING SYSTEM

[75] Inventors: Gregory J. Kovacs, Mississauga; Rafik O. Loutfy, Willowdale, both of Canada

[73] Assignee: Xerox Corporation, Stamford, Conn.

[21] Appl. No.: 272,040

[22] Filed: Nov. 16, 1988

[51] Int. Cl.4 ............................................. G01D 15/00
[52] U.S. Cl. .................................... 346/160; 346/155
[58] Field of Search ................... 346/160, 155, 134 C, 346/107 R, 108; 350/357, 331 R; 358/300, 302; 250/220; 429/111

[56] References Cited

U.S. PATENT DOCUMENTS

| | | | |
|---|---|---|---|
| 3,439,174 | 4/1969 | Snaper et al. | 250/213 |
| 3,521,941 | 7/1970 | Deb et al. | 350/160 |
| 3,589,896 | 7/1971 | Wilcox | 96/1.5 |
| 3,708,220 | 1/1923 | Meyers et al. | 429/111 |
| 3,840,288 | 10/1974 | Schnatterly | 350/160 R |
| 3,986,771 | 10/1976 | Tsukada | 355/3 R |
| 4,110,014 | 8/1978 | Yevick | 350/342 |
| 4,150,876 | 4/1979 | Yevick | 350/338 |
| 4,229,095 | 10/1980 | Mir | 355/4 |
| 4,297,695 | 10/1981 | Marshall | 340/752 |
| 4,374,397 | 2/1983 | Mir | 358/75 |
| 4,375,647 | 3/1983 | Mir | 358/75 |
| 4,375,648 | 3/1983 | Mir | 358/75 |
| 4,378,568 | 3/1983 | Mir | 358/75 |
| 4,426,643 | 1/1984 | Martin | 340/713 |
| 4,449,153 | 5/1984 | Tschang | 358/296 |
| 4,458,989 | 7/1984 | Tschang | 350/356 |
| 4,479,121 | 10/1984 | Tabata | 340/785 |
| 4,560,994 | 12/1985 | Sprague | 346/108 |
| 4,595,259 | 6/1986 | Perregaux | 350/331 R |

Primary Examiner—Arthur G. Evans
Attorney, Agent, or Firm—Judith L. Byorick

[57] ABSTRACT

Disclosed is an image bar for use in an imaging apparatus, comprising a linear light valve array with a plurality of discrete, independently addressable pixel portions activatable between light transmitting, partially transmitting, and non-transmitting wavelengths by selective application of an electrical field. The pixel portions comprise, in the order stated, a first transparent substrate; a transparent electrode in contact with the first transparent substrate; a thin film comprising an electrochromic material in contact with the transparent electrode; a transparent electrolytic material in contact with the thin film; a counterelectrode in contact with the transparent electrolytic material; and a second substrate.

36 Claims, 16 Drawing Sheets

IMAGE BAR WITH ELECTROCHROMIC SWITCHING SYSTEM

BACKGROUND OF THE INVENTION

The present invention is directed to a device and a process for the production of electrophotographic images. More specifically, the present invention is directed to a shutter-type image bar that utilizes an electrochromic switching system and is suitable for use in an electronic copier or printer.

Shutter-type optical image bars are arrays of pixel sized shutters controlling the light output of a uniform source. A typical shutter-type image bar constitutes a single or double line array of electrically addressed shutters that either do or do not allow light to pass. The arrays are used to expose a photosensitive medium, such as a charged photoreceptor. Thus, a latent electrostatic image is formed on the photosensitive medium by passing light from a uniform light source through the image bar and onto the photosensitive medium, thereby selectively exposing and discharging certain areas on the medium.

Many known shutter-type image bars contain liquid crystal systems, wherein the shutters comprise individually addressed liquid crystal devices that either allow light to pass through them or exist in an opaque state that does not permit the passage of light, depending on the voltage applied to each shutter. Liquid crystal devices are generally not color selective, and are suitable only for black and white light shuttering, and thus black and white printing. However, certain special complex cell configurations using a plurality of different liquid crystalline materials do allow for multicolor applications, as disclosed in T. Uchida, *Mol. Cryst. Liq. Cryst.* 123 (1–4), 15–55 (1985). Liquid crystal image bars tend to be disadvantageous in that many layers of different liquid crystalline materials are required for color selective shuttering to enable colored image exposure of a color selective photoreceptor. Liquid crystal optical image bars also generally possess disadvantages such as the requirement of AC voltage for operation, because of the limited useful life of liquid crystal devices used in conjunction with DC power sources, with the accompanying necessity for complicated AC drive circuitry instead of relatively simple DC drive circuitry. Liquid crystal devices also require the application of power to maintain an image, since the alignment and coloration of the crystalline material in the shutters of the imaging bar will be lost as soon as voltage is removed. In addition, liquid crystal devices generally exhibit relatively slow switching times of about one millisecond, although microsecond switching times are possible in special systems, such as that disclosed in N. A. Clark and S. T. Lagerwall, *Appl. Phys. Lett.*, vol. 36, pages 899–901 (1980).

Electronic imaging devices with imaging bars are known. For example, U.S. Pat. No. 4,374,397, the disclosure of which is totally incorporated herein by reference, discloses an electronic imaging apparatus using light valve devices having improved addressing configurations and modes. The apparatus has a locationally addressing light valve array having a plurality of location-address sectors, each sector including a plurality of discrete light valve pixel portions which are electronically addressable to control the passage of light. Each discrete pixel portion is electrically coupled to one corresponding light valve pixel portion of each of the other sectors, but is independent of other light valve pixel portions in its own sector.

Further, U.S. Pat. No. 4,595,259, the disclosure of which is totally incorporated herein by reference, discloses a liquid crystal image bar for an electrophotographic printer. The image bar has a nematic liquid crystal device with crossed polarizers configured as a single array of dot shutters that are driven by a single frequency voltage source. The image bar produces latent electrostatic images on the printer's photoconductive member one line at a time in response to receipt of digitized data signals. During the operational mode, all of the image bar shutters are energized and, in this electrically driven state, the image bar shutters are non-transmissive. The latent image is produced by selective erasure of precharged background areas on the member. For the erasure to occur, interruption of the driving voltage to selected shutters in response to the data signals causes the selected shutter to become transmissive because the liquid crystal material enters a transient state. The response time for the transmissiveness is about one millisecond. Consecutively erased spots by the same shutter requires the momentary reapplication of the driving voltage.

Another patent, U.S. Pat. No. 4,375,647, the disclosure of which is totally incorporated herein by reference, discloses an apparatus for scanning successive lines of a color original moved past a scan station. The apparatus includes a photodetector means, an illuminating means for producing a plurality of discrete color separation illuminations of the detector via each passing original line, a light valve array having discretely activatable pixel portions aligned with the pixels of the scan station to control color separation illumination of the photodetector, and a scan address means for activating pixel portions of the array in a predetermined serial sequence and in timed relation with the movement of the original.

Additionally, U.S. Pat. No. 4,375,648, the disclosure of which is totally incorporated herein by reference, discloses a high resolution light valve apparatus for electronic imaging. The apparatus utilizes an area light valve array to effect high pixel resolution exposure of a line of record medium passing through an area exposure region during a plurality of partial line exposure subperiods. This apparatus provides improvements in electro-optic modulator and addressing electrode structure of light valve devices which provide for simplified, high resolution optical address of pixels. Also, U.S. Pat. No. 4,378,568, the disclosure of which is totally incorporated herein by reference, discloses a light valve imaging apparatus having a line of discretely addressable pixels that can be activated between a light transmitting state and a light blocking state by an electrical field. The apparatus possesses improved structure and method for electrical addressing of the light valve apparatus.

Further, U.S. Pat. No. 4,449,153, the disclosure of which is totally incorporated herein by reference, is directed to an apparatus and method for light valve imaging wherein light is uniformly directed onto a linear light valve array, which includes pixel portions selectively activated to block or transmit light during successive line address periods. The patent discloses an improved gray scale imaging method wherein the intensity of the light passing to the light valve array is modulated during each line address period. In addition, U.S. Pat. No. 4,458,989, the disclosure of which is totally incorporated herein by reference, discloses an electro-optic addressing apparatus having an improved electrode configuration and an improved address control. During a first address stage, activating and inactivating reference potentials are applied respectively to first and second adjacent pixel portions of the modulator while an addressing signal potential is applied to both pixel portions. During a second address stage, activating and inactivating reference potentials are applied respectively to the second and first pixel portions while signal potential is applied to both pixel portions.

Another patent, U.S. Pat. No. 4,560,994, the disclosure of which is totally incorporated herein by reference, discloses a two dimensional electro-optic modulator for printing which comprises an electro-optic element and a two dimensional planar array of individually addressable electrodes for spatially modulating a light beam along a plurality of transverse axes. The modulator is useful for applications such as electro-optic line printing and optical displays.

In addition, U.S. Pat. No. 3,439,174, the disclosure of which is totally incorporated herein by reference, discloses an image forming mechanism in which a light image is transformed or converted to a semipermanent type of image. The image may be retained as long as is desired, and the mechanism can be reused. This mechanism is based on an electrolytic process and comprises a laminar sandwich arrangement of several layers among which are included a transparent substrate, a transparent electrode, a transparent photoconductor, an electrolyte layer, and a metallic anode. The light image is transformed by the deposition of a corresponding metallic image on the photoconductive layer. Also, U.S. Pat. No. 4,250,876, the disclosure of which is totally incorporated herein by reference, discloses a light amplification device employing transparent sheets between which an electric field is impressed and having a photoconductive sheet and an electrically optically active sheet such as a liquid crystal sheet. A lattice member is inserted between the photoconductive sheet and the liquid crystal sheet, and a gravure display results. Color displays are also possible with the disclosed apparatus.

Electrochromic materials such as those employed with the present invention are known. In general, electrochromic materials are those materials having at least two oxidation states and for which the material is of a different color in different oxidation states. The material shifts from one oxidation state to another when an electron is either removed (oxidation) or added (reduction) by an electric field applied to it. An electrochromic display, for example, operates by means of an electrochemically induced color change on an active film coating. A thin film is deposited on a conductive substrate and is used as an electrode in an electrochemical cell, where it can be reduced or oxidized. The film will have a reversible characteristic color change depending on the magnitude and polarity of the applied voltage.

Electrochromic and electro-optical devices are also known. For example, U.S. Pat. No. 3,521,941 discloses an electro-optical device comprising a layer of a transition metal compound exhibiting persistent electrochromism and an insulating layer sandwiched between two conductive transparent electrodes. Coloration and bleaching occur in the device when the polarity of the applied electric field is controlled. The device disclosed in the patent provides an improvement over known devices by addition of the insulating layer to the electrode-electrochromic layer sandwich. This insulating layer allows rapid change of the electrochromic material with application of the electric field and rapid return to the original state. The electrochromic layer may be of an electrically insulating or semiconducting material having the ability to remain in the absorptive state to which it is changed after removal of the electric field, instead of instantaneously reverting to its initial state.

A similar electrochromic device is disclosed in U.S. Pat. No. 3,986,771, which teaches a device allowing storage and reproduction of an original light image consisting of an electrochromic layer and a photoconductive layer sandwiched between conductive transparent electrodes. The device allows for repeated storage and erasure of information on the information storage medium, which comprises an electrochromic material. In addition, the device possesses a means for projecting an original image onto a storage medium, and is capable of projecting an image stored on the storage medium onto a photosensitive material, so that copies may be made. Free modification or compiling of the original image by erasure or addition is also possible.

An electrochromic display device with the ability to maintain constant color density is disclosed in U.S. Pat. No. 4,479,121. The device comprises a plurality of display segments on one substrate in contact with an electrolyte, which in turn is in contact with the counterelectrode on the surface of a second sandwiching substrate. Each display segment comprises a transparent electrode covered by an electrochromic layer that exhibits either a colored or a bleached state, depending on the amount of electric charge held by the display segment. Color density is maintained constant by the injection or extraction of electric charge into or from the display segments, which compensates for the difference between the coloration electric charge quantity at the present display state and the charge quantity at the next display state.

Another patent, U.S. Pat. No. 4,110,014, discloses an apparatus for displaying information stored in the form of microimages and for presenting and recording time-sequential information such as television signals. A switching apparatus is coupled to a plurality of transparent conductive strips separated from each other such that each may assume its own electrical potential. The device includes an electro-optic sheet and a photoconductive sheet sandwiched between two planar X and Y sets of transparent conductive addressor strips. The X addressor strips are positioned at right angles to the Y addressor strips. In the parallel mode of operation, the addressor strips of each set carry the same potential, and a uniform potential is maintained between the X and Y electrodes. In the series mode of operation, the electro-optic sheet undergoes a change in optical property when locally impressed by an electric field. The X and Y addressor circuits are coupled to conventional series information sources, such as a television receiving system. Serial information may be recorded by uniformly exposing the photoconductor of the device and using the addressor strips to produce an image pattern in the electro-optic layer.

An electro-optical color imaging apparatus in which a plurality of discrete picture elements, or pixels, of a color sensitive imaging layer or layers are concurrently imagewise exposed is disclosed in U.S. Pat. No. 4,229,095. The apparatus is suitable for use with a multicolor mixture of photoconductive particles or other color sensitive imaging layers, and comprises a plurality of separately addressable electro-optical illuminating means which concurrently subject a plurality of picture elements of the imaging layer respectively to different color light pulses in accordance with the color content of the image to be formed.

Another publication, U.S. Pat. No. 3,589,896, discloses an electro-optical article employing electrochromic and photoconductive materials. The device comprises an electrochromic material sandwiched between electrodes, with an additional layer of a photoconductive material, such that the device can be used for computer generated display applications. This additional layer comprises a sustained bombardment induced conductivity (SBIC) material, which is similar to a photoconductor, but is also sensitive to electron beam excitation.

Additionally, U.S. Pat. No. 3,708,220 discloses an electro-optical device useful for controlling the absorption of visible and infrared radiation by windows, data display devices, and other items. The device comprises a pair of electrodes between which are situated two identical layers of transition metal electrochromic compounds separated by a semisolid highly conductive sulfuric acid gel electrolyte. Further, U.S. Pat. No. 3,840,288 discloses an electrochromic device having a layered structure comprising, in the order stated, a transparent conductive electrode, an electrochromic layer, an ion permeable insulator layer, an electrocatalytic layer, a sponge material, and an optional top electrode. The device allows for an all solid state display, and can be altered from the first absorption state to the second by the ionization of atoms or molecules in the electrocatalytic layer, which results in a reversible color change.

In U.S. Pat. No. 4,297,695, an electrochromic display device operated by selective application of electrical signals to first and second electrode matrix addressing means having a potential of signals sufficient to produce local color changes in an electrochromic material is disclosed. A color change is effected by a short "expose" pulse, provided by the first matrix, said pulse having a potential above the threshold required for coloration but with insufficient charge to cause coloration, followed by a second, longer "develop" pulse, provided by the second matrix, said pulse being below the coloration threshold potential.

Further, U.S. Pat. No. 4,426,643 discloses an electrolytic apparatus employing a reference electrode, such as an electrochromic display of the type employing potentiostatic control of write or erase operations. The apparatus has at least one electrode on which a predetermined amount of electrochromic or other electrodepositable material is maintained or replenished by intermittent connection of the electrode to a source of write current. According to this patent, a coated reference electrode of this type has a stable potential with respect to the solution, which is necessary for potentiostatic control.

Although the apparatuses and methods of the prior art are suitable for their intended purposes, a need exists for shutter-type image bars which can either fully discharge selected areas of a photoreceptor for the formation of single colored images or can modulate the level of photoreceptor discharge in a single pass, with the resulting voltage levels being selectively developed with different colored toners, for the formation of images of more than one color. There is also a need for an image bar with multi-color switching capability which can write a multi-color or full-color image on a photoreceptor, which photoreceptor has color selectivity in that it discharges to different levels of potential depending on the color of the exposing light. In addition, there is a need for an image bar with multi-color switching capability that contains a single active material. Further, a need exists for image bars capable of operating with DC voltage, such that they may possess a simple drive circuitry. In addition, a need exists for image bars with rapid switching times to enable high speed formation of images. A need also exists for image bars with low cost, low switching energy, and low voltage requirements that also provide images of high contrast. Further, a need exists for imaging bars wherein the individually addressable pixels retain their coloration without the need for a continuously applied electric field after the pixel has been switched to its desired state, in order to provide devices with lower energy consumption requirements as compared to devices containing liquid crystal image bars.

SUMMARY OF THE INVENTION

It is an object of the present invention to provide an image bar with the above noted advantages for use in the production of electrophotographic images.

It is another object of the present invention to provide an image bar that employs an electrochromic switching system.

It is yet another object of the present invention to provide an image bar which can either fully discharge selected areas of the photoreceptor for the formation of single colored images or can modulate the level of photoreceptor discharge in a single pass to enable images of more than one color.

An additional object of the present invention is to provide an image bar with multi-color switching capability which can write a multi-color or full-color image on a photoreceptor, which photoreceptor has color selectivity in that it discharges to different levels of potential depending on the color of the exposing light.

It is another object of the present invention to provide an image bar with multi-color switching capability that contains a single active material.

A further object of the present invention is to provide an image bar having rapid switching times to enable high speed formation of images.

Another object of the present invention resides in the provision of an image bar capable of operating with DC voltage, such that it possesses a simple drive circuitry.

Yet another object of the present invention resides in the provision of an image bar with low cost, low switching energy, and low voltage requirements that also provides images of high contrast.

It is another object of the present invention to provide an image bar wherein the individually addressable pixels retain their coloration without the need for a continuously applied electric field after the pixel has been switched to its desired state, such that the device containing the imaging bar possesses lower energy consumption requirements as compared to devices containing liquid crystal image bars.

These and other objects of the present invention are achieved by providing an image bar comprising a linear light valve array with a plurality of discrete, independently addressable pixel portions activatable between light transmitting, partially transmitting, and non-transmitting wavelengths by selective application of an electric field, wherein said pixel portions comprise, in the order stated, a first transparent substrate; a transparent electrode in contact with said first transparent substrate and connected to a variable current, variable voltage source; a thin film comprising an electrochromic material in contact with said transparent electrode; a transparent electrolytic material in contact with said thin film; a counterelectrode in contact with said transparent electrolytic material and connected to said variable current, variable voltage source; and a second substrate.

In another embodiment, the present invention comprises an improved image bar for an imaging apparatus with a photoconductive member, means for pre-charging the photoconductive member prior to the formation of latent electrostatic images, means for developing the latent images, means for transferring the developed images to substrates, and means for cleaning the photoconductive member prior to pre-charging, the image bar containing at least one row of dot shutters which selectively pass light in response to digitized data signals, during the operating mode of the imaging apparatus, to discharge selectively the pre-charged photoconductive member and thus form the latent images on the photoconductive member line by line, which image bar comprises, in the order stated, a first transparent substrate; a plurality of transparent electrodes in contact with said first transparent substrate and connected to independent outputs of a variable current, variable voltage source; a thin film comprising an electrochromic material in contact with said transparent electrodes; a transparent electrolytic material in contact with said thin film; a counterelectrode in contact with said transparent electrolytic material and connected to a common reference terminal of the variable current, variable voltage source; and a second substrate.

Another embodiment of the present invention resides in an image bar comprising a linear light valve array with a plurality of discrete, independently addressable pixel portions activatable between light transmitting, partially transmitting, and non-transmitting wavelengths by selective application of an electric field, wherein each pixel comprises: a first transparent substrate; a second substrate; a plurality of first transparent electrodes; a second counterelectrode situated between said first and second substrates, such that said first transparent electrodes are situated on said first transparent substrate and said second counterelectrode is situated on said second substrate; a thin film comprising an electrochromic material, said film being situated on said first transparent electrodes; and an electrolytic material situated between said thin film and said second counterelectrode; wherein said first transparent electrodes are connected to independent outputs of a variable current, variable voltage source and said second counterelectrode is connected to a common reference terminal of said variable current, variable voltage sources.

In still another embodiment, the present invention comprises an imaging apparatus comprising a photoconductive member; means for pre-charging the photoconductive member prior to the formation of latent electrostatic images; means for developing the latent images with toner particles; means for transferring the developed images to substrates; means for cleaning the photoconductive member prior to pre-charging; an image bar containing at least one row of dot shutters which selectively pass light in response to digitized data signals, during the operating mode of the imaging apparatus, to discharge selectively the pre-charged photoconductive member and thus form the latent images on the photoconductive member line by line, said image bar comprising, in the order stated, a first transparent substrate, a plurality of transparent electrodes in contact with said first transparent substrate and connected to independent outputs of a variable current, variable voltage source, a thin film comprising an electrochromic material in contact with said transparent electrodes, a transparent electrolytic material in contact with said thin film, a counterelectrode in contact with said transparent electrolytic material and connected to a common reference terminal of said variable current, variable voltage source, and a second transparent substrate in contact with said counterelectrode; means for illuminating elements of said array with light; and addressing means for activating predetermined of said array pixels during a line exposure period in accordance with pixel transmission information of a line of the image to be reproduced.

Yet another embodiment of the present invention resides in an imaging apparatus comprising: a photoconductive member; means for pre-charging the photoconductive member prior to the formation of latent electrostatic images; means for developing the latent images with toner particles; means for transferring the developed images to substrates; means for cleaning the photoconductive member before it is pre-charged; an image bar containing at least one row of dot shutters which selectively pass light in response to digitized data signals, during the operating mode of the imaging apparatus, to discharge selectively the pre-charged photoconductive member and thus form the latent images on the photoconductive member one line at a time, said image bar comprising, in the order stated, a first transparent substrate, a second substrate, a plurality of first transparent electrodes and a second counterelectrode situated between said first and second substrates, such that said first transparent electrodes are situated on said first transparent substrate and are connected to independent outputs of a variable current, variable voltage source, and said second counterelectrode is situated on said second substrate and is connected to a common reference terminal of said variable current, variable voltage source, a thin film comprising an electrochromic material, said film being situated on said first transparent electrode, and an electrolytic material situated between said thin film and said second counterelectrode; means for illuminating elements of said array with light; and addressing means for activating predetermined of said array pixels during a line exposure period in accordance with pixel transmission information of a line of the image to be reproduced.

BREIF DESCRIPTION OF THE DRAWINGS

FIGS. 6A through 6K illustrate the change, upon reduction or oxidation, in the spectral absorbance of films of a number of electrochromic materials.

DETAILED DESCRIPTION OF PREFERRED EMBODIMENTS

Figure 1:
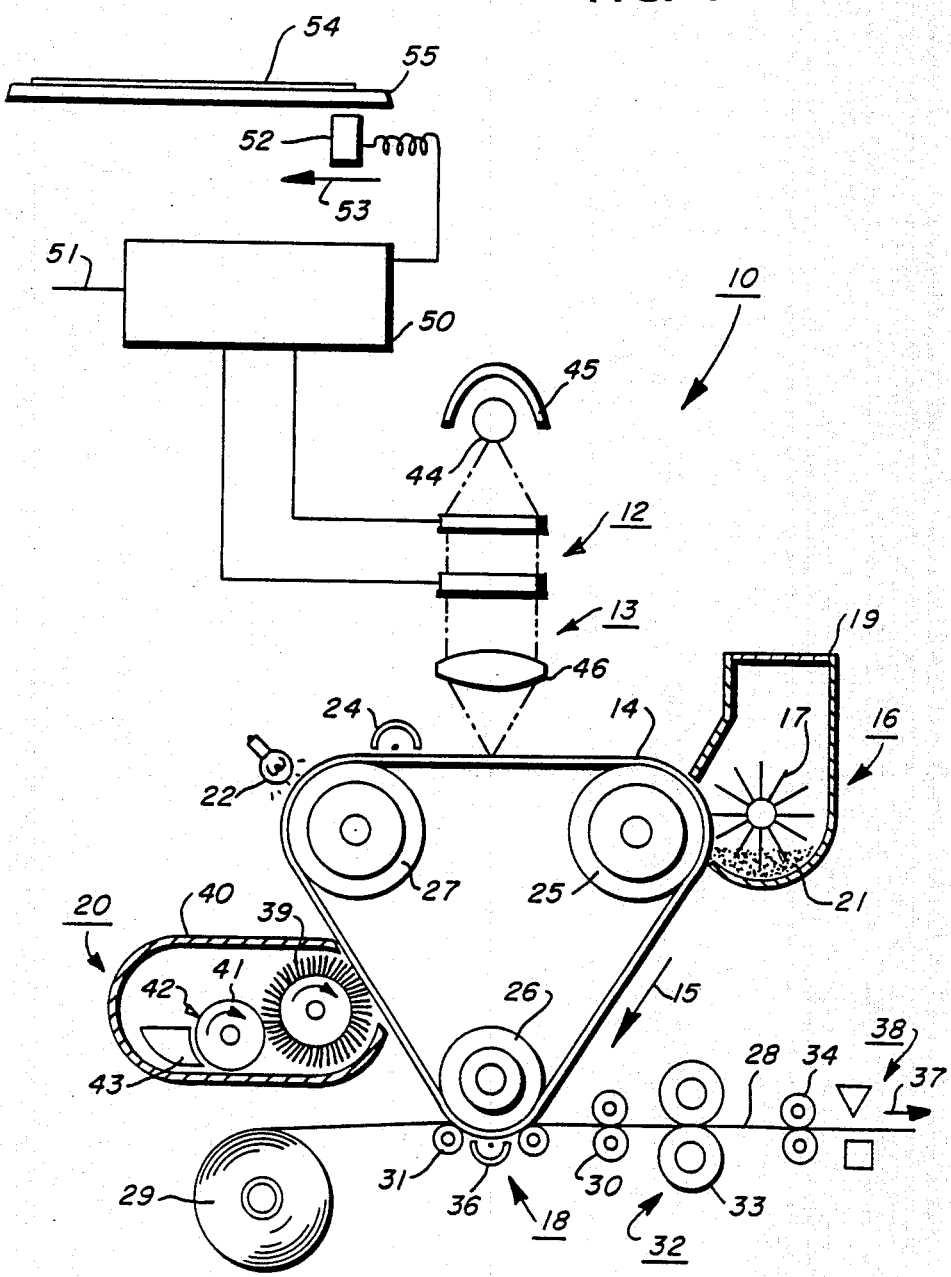
FIG. 1 illustrates an electrophotographic imaging system in which is contained the image bar of the present invention.

FIG. 1 illustrates an electrophotographic printer 10 arranged in accordance with the present invention utilizing an electrochromic image bar 12. The printer 10 includes a series of process stations through which a photoconductive member 14 in the form of an endless belt passes. Although the preferred embodiment depicts an endless belt configuration of the photoconductive member, various other configurations (not shown) could be used, such as a cylindrical drum.

Beginning with the imaging station 13, at which the latent electrostatic imaging is formed, the photoconductive member 14 proceeds in the direction of arrow 15 around guide rollers 25, 26 and 27, past development station 16, transfer station 18, cleaning station 20, erase lamp 22, and precharging corona generating device 24 prior to returning to the imaging station. At least one guide roller is adjustable to maintain appropriate tension on the photoconductive member and to steer the photoconductive member 14 so that it does not gradually travel or "walk" off of the guide rollers. The adjustable roller, which in the preferred embodiment is roller 27, may be steered automatically by means well known in the belt tracking prior art.

At development station 16, a rotating magnet brush or paddle wheel 17, housed in hopper 19, presents toner particles 21 onto the surface of the photoconductive member 14 as it moves around guide roller 25. The toner particles 21 are charged with a polarity opposite to that of the charges placed on the photoconductive member by the corona generating device 24 by means well known in the art, either by triboelectric charging technique or by a corona generating device (not shown) or both. The toner particles are attracted and held by the latent electrostatic image recorded on the photoconductive member of the imaging station, thus developing and rendering the latent image visible. The developed image is transferred to a permanent material 28, such as paper, at the transfer station 18. After the developed imaging is transferred, the photoconductive member proceeds past the cleaning station 20, where all residual toner particles are removed.

The developed image is electrostatically transferred to the paper at the transfer station 18. The paper is provided by supply roll 29, which is pulled through the transfer station via drive rolls 30 and through a toner particle fusing station 32 by drive rolls 34, where the developed image on the paper is permanently fixed thereto by means well known in the prior art, such as by fusing rolls 33 that apply heat and pressure to the developed image. A pair of idler rollers 31 are positioned to maintain the paper in intimate contact with the photoconductive member at guide roller 26, while transfer corona generating device 36 places an electric charge of opposite polarity to that of the charged toner particles to the back side of the paper. The magnitude of the charge from corona generating device 36 is greater than that of the latent electrostatic image to facilitate transfer of the developed image to the paper. This electrostatic transfer technique is well established in the prior art along with many variations thereof.

Cutter assembly 38 cuts the paper 28 with the fixed images into separate sheets as the paper moves in the direction of arrow 37 and exits from the printer 10 into a collection tray or sorter (not shown).

Subsequent to the developed image transfer, the photoconductive member 14 is moved past the cleaning station 20, which removes any residual toner particles not transferred to the paper. A soft rotating brush 39, housed in chamber 40, removes the residual toner from the photoconductive member 14. A single conductive, electrically biased roll 41 is used to remove the toner particles from the brush 39. A conventional flicker bar (not shown) is arranged to assist in toner particle removal from the soft brush, and a doctor blade 42 is used on the biased roll 41 to scrape the toner particles from the roll into a collecting tray 43, so that the toner particles collected may be reused if desired.

The imaging station comprises a light source 44 and reflector 45, which illuminates an electrochromic image bar 12, more fully discussed herein. Light selectively passed through the image bar is focused by lens means 46 which may be one or more single lens, a selfoc lens system or a plurality of minature lens associated with fiber optics. The image bar selectively passes light to form a latent electrostatic image one line at a time by erasing or discharging the image background areas. The image bar is formed by a single row of dot shutters actuated by selective application of a voltage to the plurality of electrodes on one of the substrates of the image bar. An electronic controller or microcomputer 50 energizes the appropriate electrodes in response to digitized data from a scanning means such as a charged coupled device (CCD) 52 or digitized data from a source outside the printer 10, such as a character generator, computer or other means for storing and retrieving data, via conduit 51. If a scanning CCD is used, it scans one line of information at a time from a stationary document 54 placed on a transparent, fixed platen 55. The CCD scanning speed in the direction of arrow 53 is substantially the same as the speed of the photoconductive member if real time imaging is to occur. Otherwise, a means for storing the document digitized data would have to be included in the electronic controller.

Figure 2:
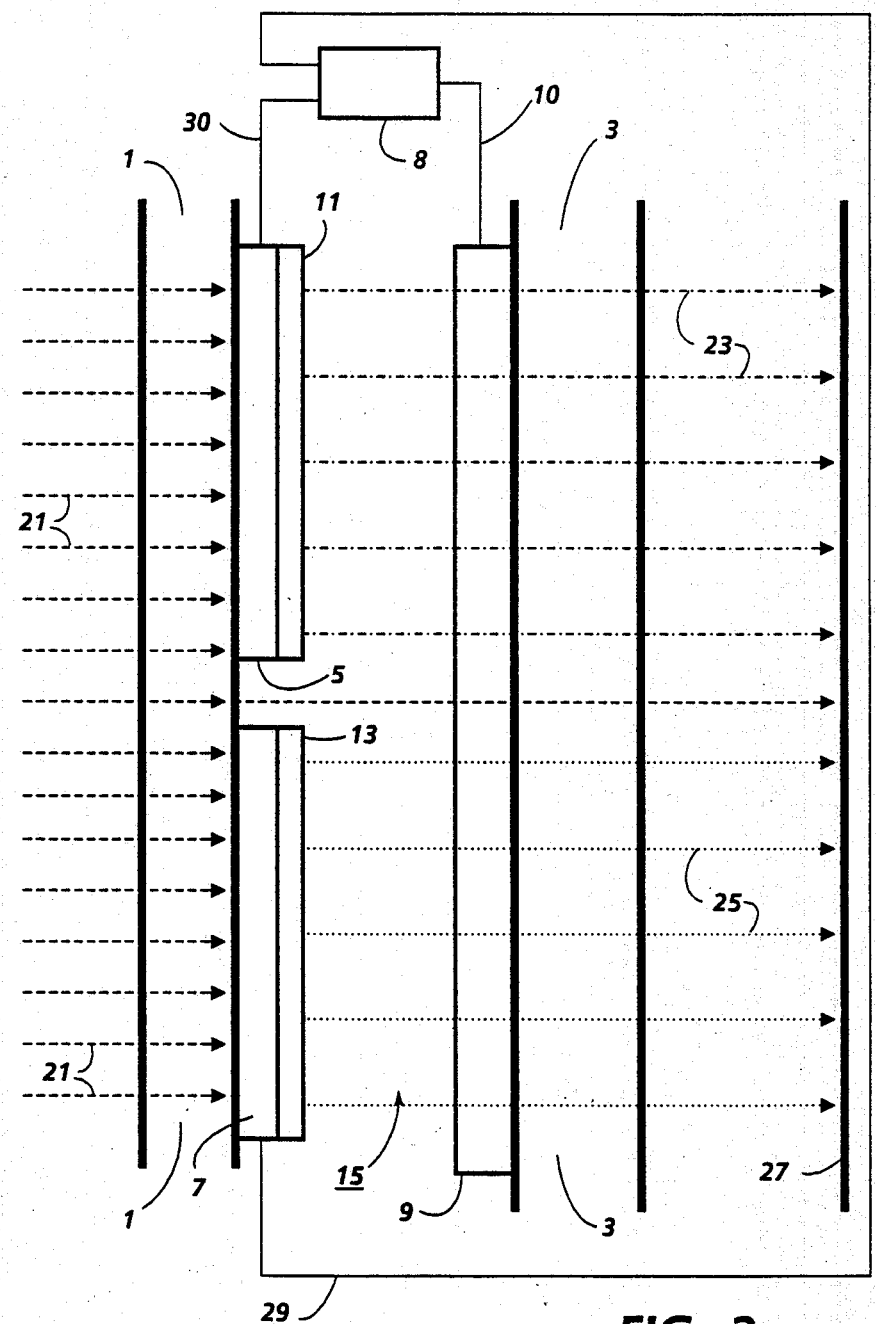
FIG. 2 illustrates one embodiment of the image bar of the present invention, wherein each pixel is equipped with a separate electrochromic film and wherein the image bar shutters transmitted light.

FIG. 2 illustrates one possible configuration for the image bar and imaging system of the present invention, wherein two pixels or dot shutters are shown here in cross-section. Transparent substrates 1 and 3, which generally are from about 1/16 inch to about ¼ inch in thickness, contain between them a plurality of transparent electrodes 5 and 7 and a single transparent counterelectrode 9. The electrodes generally are from about 0.1 micron to about 10 microns in thickness. Contained upon each of the electrodes 5 and 7 are thin films 11 and 13 having a thickness of from about 0.05 to about 1.0 micron and comprising an electrochromic material such as a transistion metal complex, a phthalocyanine, an anthraquinone, or any other suitable material.

Situated between the electrodes 5 and 7 and the counterelectrode 9 is a transparent electrolytic material 15, which may be either a solid material, such as calcium fluoride, or a liquid material, such as an aqueous solution of potassium chloride, which liquid electrolyte is held in place by gaskets (not shown). Electrodes 5 and 7 are independently switchable, and thus are shown in FIG. 2 to be connected by wires 29 and 30 to two independent outputs of a variable voltage/current source or driver 8. The driver generally is capable of generating from about −10 volts to about +10 volts. Electrode 5, electrode 7 and counterelectrode 9 are all connected to the variable voltage and variable current driver 8. The variable voltages at 29 and 30 are applied relative to the common counterelectrode, which is connected to driver 8 through wire 10 as shown in FIG. 2. In operation, each of the electrodes 5 and 7 are individually addressed to apply the desired voltage and current between electrodes 5 and 7 and counterelectrode 9, such that each thin film 11 and 13 is in the desired oxidation state. White light from a light source means, such as a xenon lamp (not shown), indicated by arrows 21 in FIG. 2, passes through transparent substrate 1 and transparent electrodes 5 and 7, and is selectively filtered by thin films 11 and 13. As shown in this specific embodiment of the invention, thin film 11 is a material that, in one of its oxidation states, possesses a red color and filters out light from all portions of the visible spectrum except for red light, which is permitted to pass through the film. Similarly, thin film 13 consists of a material identical to that of thin film 11, and is in another of the material's oxidation states, such that it possesses a blue color and filters out light from all portions of the visible spectrum except for blue light, which is permitted to pass through the film. An example of such a material is poly-3-methylthiophene, which is red in its reduced state and blue in its oxidized state. Red light, indicated by arrows 23, and blue light, indicated by arrows 25, pass through the transparent electrolyte 15, the transparent counterelectrode 9, and transparent substrate 3, and discharge areas of a photoreceptor 27.

Figure 3:
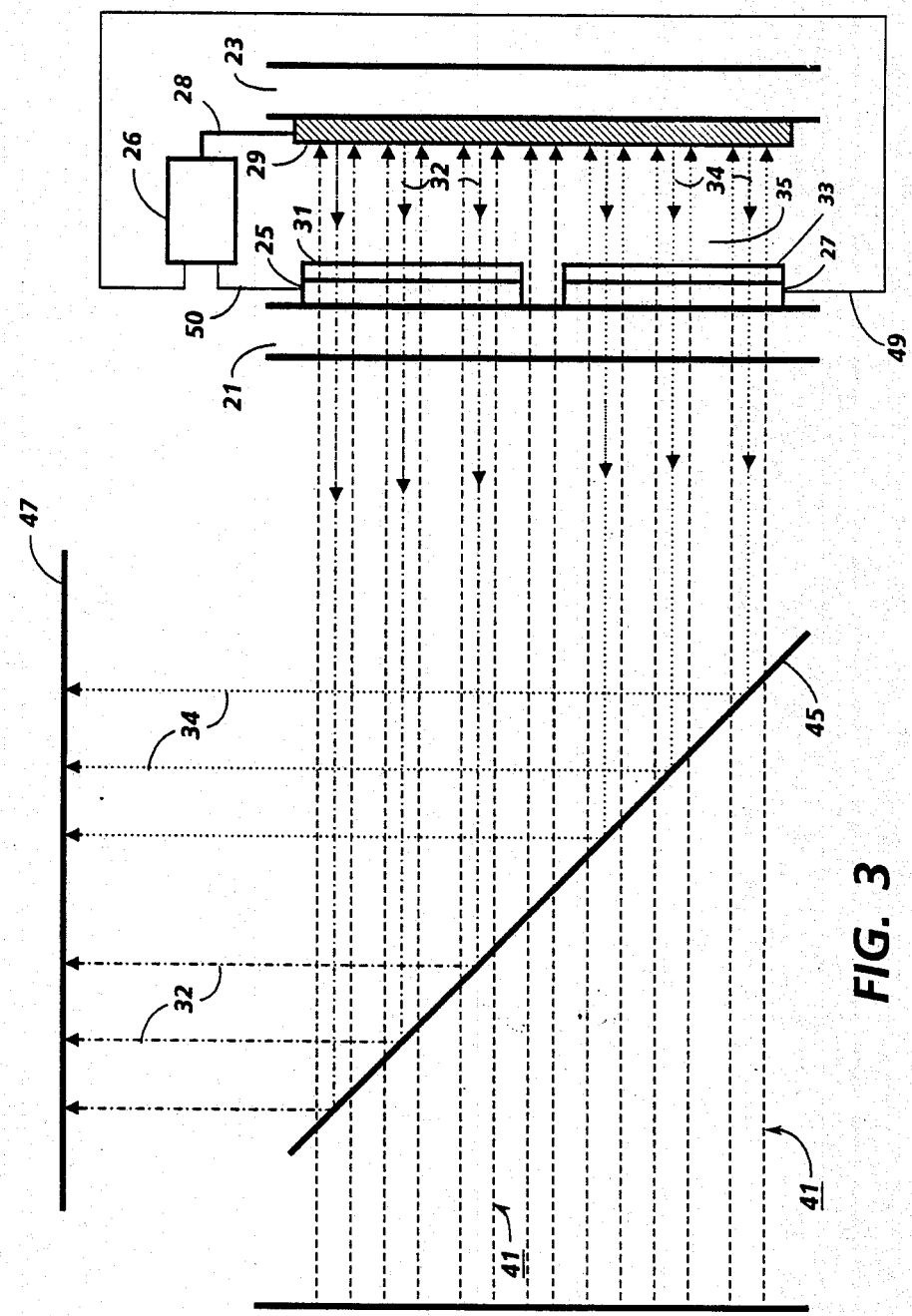
FIG. 3 illustrates another embodiment of the image bar of the present invention, wherein each pixel is equipped with a separate electrochromic film and wherein the image bar shutters reflected light.

FIG. 3 illustrates another possible configuration for the image bar and imaging system of the present invention, wherein the image bar shutters reflected light, as opposed to transmitted light, which was shuttered in the embodiment shown in FIG. 2. Transparent substrate 21 and substrate 23 contain between them a plurality of transparent electrodes 25 and 27 and a single counterelectrode 29. The counterelectrode 29 should not be transparent in this embodiment, but should rather be highly reflective and may be of a material such as platinum. Contained upon each of the electrodes 25 and 27 are thin films 31 and 33 having a thickness of from about 0.05 to about 1.0 micron and comprising an electrochromic material such as a transition metal complex, a phthalocyanine, an anthraquinone, or any other suitable material.

Situated between the electrodes 25 and 27 and the counterelectrode 29 is a transparent electrolytic material 35, which may be either a solid material, such as calcium fluoride, or a liquid material, such as an aqueous solution of potassium chloride. Electrodes 25 and 27 are independently switchable and thus are shown in FIG. 3 to be connected by wires 49 and 50 to two independent outputs of a variable voltage/current source or driver 26. The variable outputs are applied relative to the common counterelectrode 29 which is connected to driver 26 through wire 28 as shown in FIG. 3. In operation, each of the electrodes 25 and 27 are individually addressed to apply the desired voltage and current between electrodes 25 and 27 and counterelectrode 29, such that each thin film 31 and 33 is in the desired oxidation state. White light from a light source means, such as a xenon lamp (not shown), indicated by arrows 41 in FIG. 3, passes through semi-mirror 45 and through a transparent substrate 21. Semi-mirror 45 is situated at a 45 degree angle with respect to white light 41, and is of a material that permits some light to pass and also reflects light. For example, semi-mirror 45 may be formulated of glass, on one surface of which has been vacuum deposited a thin layer of aluminum of a thickness of about 100 Angstroms. Some of the incident white light 41 is also reflected down (not shown) by the semi-mirror and is lost. The white light which is transmitted through the semi-mirror 45 then passes through transparent electrodes 25 and 27. As shown in this specific embodiment of the invention, thin film 31 is a material that, in one of its oxidation states, possesses a red color and filters out light from all portions of the visible spectrum except for red light, which is permitted to pass through the film, indicated by arrows 32. Similarly, thin film 33 consists of a material identical to that of thin film 31, and is in another of the material's oxidation states, such that it possesses a blue color and filters out light from all portions of the visible spectrum except for blue light, which is permitted to pass through the film, shown by arrows 34. The platinum counterelectrode 29 is highly reflective, and reflects the red and blue light transmitted by thin films 31 and 33 respectively back through films 31 and 33. Since thin film 31 transmits only red light, the reflected red light again passes through the film 31 and electrode 25 as well as the transparent substrate 21 toward the semi-mirror 45. Likewise, since thin film 33 transmits only blue light, the reflected blue light from the platinum counterelectrode 29 passes again through thin film 33 as well as through electrode 27 and transparent substrate 21 toward semi-mirror 45. The areas of red light and blue light are reflected by the semi-mirror 45 and onto the photoreceptor 47. Some of the blue and red light incident from the right onto semi-mirror 45 is transmitted by semi-mirror 45 back to the light source instead of being reflected (not shown). The areas of red and blue light which are incident onto photoreceptor 47 discharge those areas of photoreceptor 47 to varying degrees. The relative discharge of the red and blue areas on photoreceptor 47 depends on the inherent color selectivity and sensitivity of photoreceptor 47. The varying voltage levels on photoreceptor 47 which result can then be selectively developed by different color toners to produce a highlight color or full color image.

Figure 4:
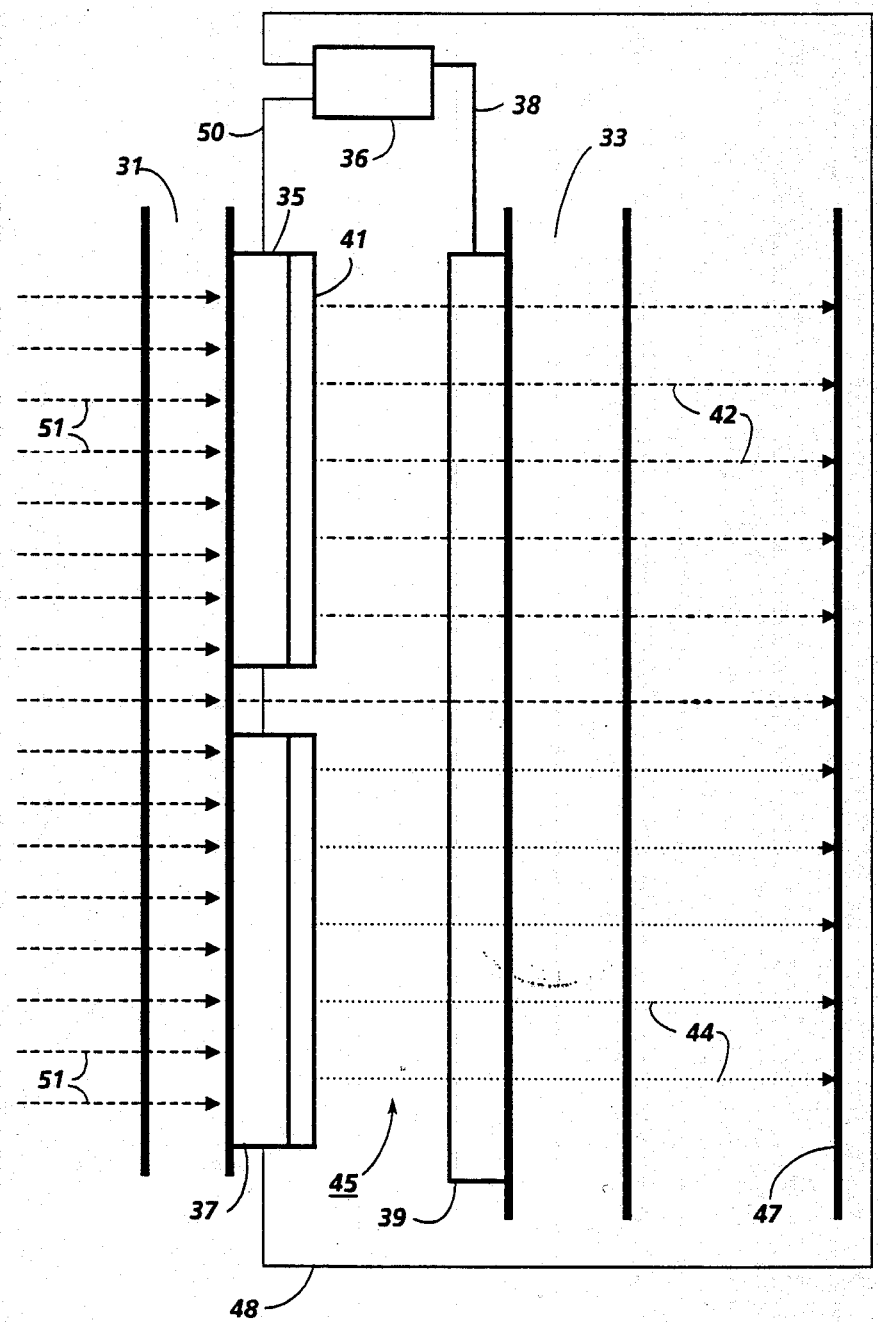
FIG. 4 illustrates still another embodiment of the present invention, wherein each pixel of the image bar of the present invention comprises a single electrode and the electrochromic material is deposited in a continuous manner and therefore also occupies the area between the electrodes.

FIG. 4 illustrates still another possible configuration for the image bar and imaging system of the present invention, wherein two pixels or dot shutters are shown here in cross-section. Transparent substrates 31 and 33 contain between them a plurality of transparent electrodes 35 and 37 and a single transparent counterelectrode 39. Each of the electrodes 35 and 37 are in contact with a single, continuously deposited thin film 41 having a thickness of from about 0.05 to about 1.0 micron and comprising an electrochromic material such as a transition metal complex, a phthalocyanine, an anthraquinone, or any other suitable material. Situated between the electrodes 35 and 37 and the counterelectrode 39 is a transparent electrolytic material 45, which may be either a solid material, such as calcium fluoride, or a liquid material, such as an aqueous solution of potassium chloride, which liquid electrolyte is held in place by gaskets (not shown). Electrodes 35 and 37 are independently switchable and thus are shown in FIG. 4 to be connected by wires 48 and 50 to two independent outputs of a variable voltage/current source or driver 36. The variable outputs are applied relative to the common counterelectrode 39 which is connected to driver 36 through wire 38 as shown in FIG. 4. In operation, each of the electrodes 35 and 37 are individually addressed to apply the desired voltage and current between the electrodes 35 and 37 and the counterelectrode 39, such that thin film 41 is in the desired oxidation state in the area of electrodes 35 and 37. White light from a light source, such as a xenon lamp (not shown), indicated by arrows 51 in FIG. 4, passes through transparent substrate 31 and transparent electrodes 35 and 37, and is selectively filtered by thin film 41. As shown in this specific embodiment of the invention, in the area of electrode 35, thin film 41 possesses a red color and filters out light from all portions of the visible spectrum except for red light, which is permitted to pass through the film, shown by arrows 42. Similarly, in the area of electrode 37, thin film 41 possesses a blue color and filters out light from all portions of the visible spectrum except for blue light, which is permitted to pass through the film, shown by arrows 44. Red light 42 and blue light 44 pass through the transparent electrolyte 45, the transparent counterelectrode 39, and transparent substrate 33, and discharge areas of a photoreceptor 47.

The photoreceptor employed in the embodiments of the invention illustrated in FIGS. 2, 3, and 4 may be one of the many photoreceptors known in the art, such as a layered organic imaging member in the form of a flexible belt, or an inorganic drum photoreceptor of materials such as selenium, selenium/arsenic alloys, selenium/tellurium alloys, ternary alloys of selenium, arsenic, and tellurium, selenium, arsenic and bismuth, selenium arsenic, and antimony, and the like. The inorganic materials may also be doped with materials such as halogens, including chlorine, in amounts such as from about 10 to about 500 parts per million. Illustrative examples of suitable photoreceptors are set forth in U.S. Pat. No. 4,265,990, the disclosure of which is totally incorporated herein by reference. During the imaging process, the image bar and the photoreceptor move with respect to each other to form a completed image line by line. Preferably, the photoreceptor moves while the image bar remains stationary, although the image bar may move while the photoreceptor remains stationary, or both the image bar and the photoreceptor may move.

Figure 5:
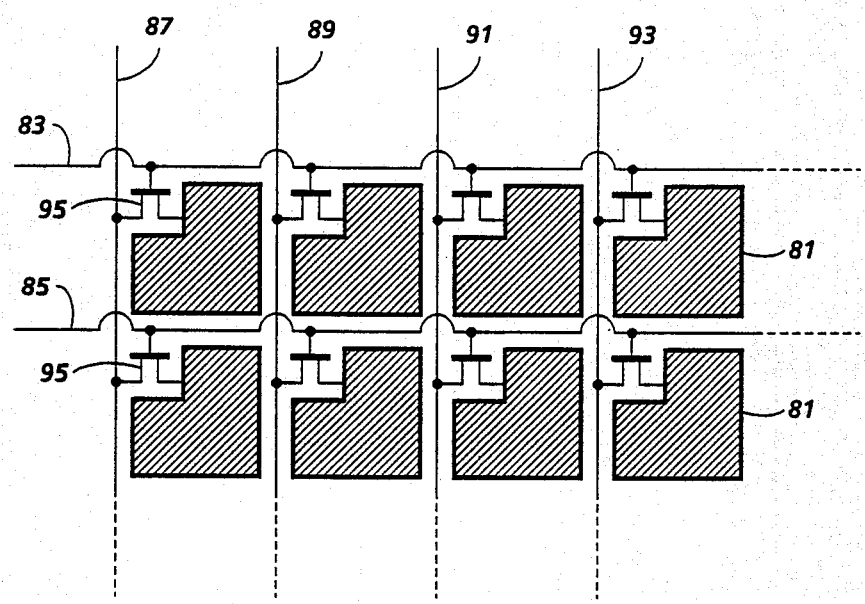
FIG. 5 illustrates a configuration for individually addressing each pixel in the image bar of the present invention.

FIG. 5 illustrates one possible multiplexing configuration for addressing the electrodes in an image bar of the present invention. Electrodes 81, in this specific embodiment, are present in an amount of from about 200 to about 2,000 per inch in each row of pixels in the image bar, and in rows of from 1 to about 5 pixels. Each electrode 81 in a row is connected to one gate line, indicated in FIG. 4 as 83 and 85, and to one source line, indicated in FIG. 4 as 87, 89, 91, and 93, by means of adjacent thin film transistors 95 shown in the corner of each pixel which act as local switches. The transistors may be made of a material such as amorphous silicon or any other material amenable to large area production of integrated devices. The production of thin film transistors of amorphous silicon is disclosed in H. C. Tuan, *Mat. Res. Soc. Symp. Proc.*, vol. 33, p. 247–257 (Elsevier, 1984); H. C. Tuan, et al., *IEEE Electron Device Letters*, vol. 3, no. 12, p. 357–359 (1982); M. J. Thompson, *J. Vac. Sci. Technol.* B2(4), p. 827–834 (1984); K. Katoh et al., *Electronics Letters*, vol. 18, no. 14, p. 599–600 (1982); P. G. LeComber et al., *Electronics Letters*, vol. 15, no. 6, p. 179–181 (1979); H. Hayama et al., *Appl. Phys. Lett.*, vol. 36, no. 9, p. 754–755 (1980); M. J. Powell et al., *Appl. Phys. Lett.*, vol. 38, no. 10, p. 794–795 (1981); A. J. Snell et al., *Appl. Phys.*, vol. 24, p. 357–362 (1981); and M. Yamano et al., *Japan Display '83; International Display Research Conference 3rd, Japan*: October 1983, the disclosures of each of which are totally incorporated herein by reference. In a multiplexed array, the driver consists of independent variable voltage and variable current outputs. The source lines 87, 89, 91 and 93 are connected to these independent outputs of variable voltage and current. The driver also consists of independent switching or enabling outputs. The gate lines 83 and 85 are connected to the independent switching or gating outputs. All transistors in a given row may be enabled by applying the required voltage and current to the gate line associated with that row; all other rows of transistors will remain off. Each transistor in the row may then be independently activated by applying the appropriate voltage and current to the source line associated with that particular transistor. Since each pixel is connected to the drain of its corresponding transistor, the pixel receives the appropriate voltage and current and switches to the desired color. The colors to which each pixel will switch is determined by the voltage level applied to each pixel. The intensity of the coloration is determined by the total current delivered to the pixel. By controlling the voltage and current delivered to the source, the color of each pixel can be controlled.

Rather than possess multiple rows of pixels and a multiplexing configuration as shown in FIG. 5, the image bar of the present invention may possess a single row of pixels. Multiplexing would then not be necessary; each pixel would require only a single lead connected to it, and local thin film transistor switches would not be needed. Again, the color and intensity of the coloration would be controlled by the voltage/current source.

The image bar of the present invention, when present in an electrophotographic imaging device, may be of a width greater than, equal to, or less than the width of the document to be reproduced on the photoconductor. If the length of the image bar is greater than the width of the document to be reproduced, those areas on the photoconductor that extend beyond the width of the document may be exposed or protected from exposure, depending upon whether the imaging system develops exposed or unexposed areas of the photoconductor, by selectively addressing the pixels of the image bar corresponding to these areas such that they either permit or prevent passage of light, in order to prevent development of a border around the copy produced. If the image bar possesses a length equal to that of the width of the document to be reproduced, the image bar may remain stationary in the imaging device, and the photorecptor moves past the imaging bar as each area of the image is reproduced on the photoconductor. If the length of the image bar is less than the width of the document to be reproduced, both the image bar and the photoreceptor will move within the imaging device, with the image bar moving in a direction orthogonal to that of the motion of the photoreceptor.

Regarding the number of pixels present in an imaging bar of the present invention, a row of pixels extending along the length of the image bar may contain from about 200 to about 2,000 pixels per inch, and preferably from about 300 to about 1,200 pixels per inch. The image bar possesses at least one row of pixels, and may possess more than one row, preferably in a staggered configuration, in order to enable the formation of images of higher resolution than is possible with image bars having only one row of pixels. Additional rows of pixels also enable more rapid formation of latent images on the photoreceptor, but also may require more complex driving circuits than are necessary for image bars with one row of pixels.

For the first substrate of the image bar of the present invention, any suitable transparent material, such as glass, plastic, polyester, quartz, and the like may be used, provided that the material is stable in the presence of the electric fields generated during the operation of the image bar, is not subject to attack by the electrolytic material, and is dimensionally stable under the heat generated during operation of the image bar. The second substrate may also be of these materials, although the second substrate need not be transparent. The transparent electrode may be made of any suitable transparent material, such as $SnO_2$, $In_2O_3$, $Sb_2O_3$, mixtures thereof, and the like, or of CuI, AgI, and mixtures thereof, provided that the material is stable to oxidation and reduction during the operation of the image bar, is not subject to attack by the electrolytic material, has good adhesion to the substrate, and is chemically and dimensionally stable under the heat generated during operation of the image bar. The counterelectrode may be of these materials, although it need not be transparent. For the embodiment of the invention represented by FIG. 3, wherein the counterelectrode and second substrate need not be transparent, the counterelectrode may be of materials such as platinum, gold, titanium, zirconium, copper, chromium, and the like, and preferably platinum or gold, and the second substrate may be of materials such as glass, quartz, plastic, polyester, aluminum, and the like. The electrode material may be deposited on the substrate by any suitable method, such as by vacuum evaporation deposition, chemical vapor deposition, sputtering, and the like. Thin film transistors such as those employed for individually addressing each pixel of the image bar as illustrated in FIG. 5 may be of amorphous silicon or of any other material amenable to large area production of integrated devices. Since the image bar is often of at least a full page width in size, the thin film transistor switches are generally formed on a substrate of this size. Amorphous silicon technology generally provides the most economical method of making arrays of switches of this size, although single crystal silicon or gallium arsenide chips of this size would be functional.

The embodiment of the invention illustrated in FIG. 4 includes a semi-mirror situated just in front of the image bar and running the entire length of the image bar, as illustrated. The semi-mirror is situated at about 45 degrees relative to the direction of the white light beam and also at about 45 degrees to the plane of the photoreceptor. The mirror can be made of a flat glass or quartz plate with an evaporated semitransparent aluminum or gold coating on the mirror face closest to the image bar.

The electrolyte situated between the electrodes of the image bar of the present invention allows current to flow through the system and provides a countercharge to balance the change in charge generated in the electrochromic film when it undergoes a change in oxidation state. This electrolytic material may be either a solid, such as $CaF_2$, $ZrO_2$, $Ta_2O_5$, $TiO_2$, $\beta\text{-}Al_2O_3$, CuI, AgI, KCl, NaCl, $SnO_2$, $In_2O_3$, $Sb_2O_3$, LiF, $MgF_2$, and the like, which solid is formed into a transparent layer by means such as vacuum evaporation deposition, chemical vapor deposition, sputtering, and the like. The electrolytic material may also be a polyelectrolyte such as sulfonated polystryene, including Versa ® TL products available from National Starch and Chemical Company, or poly(2-acrylamido-2-methyl-1-propanbesulfonic) acid. The electrolyte may also be a liquid, such as an aqueous solution of KCl, NaCl, $LiClO_4$, and the like, or an organic solvent solution of tetrabutylammonium perchlorate, tetraethyl ammonium perchlorate, tetraethyl ammonium tetrafluoborate, and the like.

Electrochromic materials suitable for the thin electrochromic films of the present invention include materials that are solid, whether as pure elements, alloys, or chemical compounds, with such materials having at least two oxidation states, preferably more, wherein a change in the oxidation state of the material may be effected by applying voltage to a thin film of the material in contact with an electrolyte and counterelectrode. Preferably, the material selected exhibits a large contrast, or a distinct, easily observable change in color when the material shifts from one oxidation state to another. The material should also exhibit sufficient stability to permit several reversible shifts in oxidation state without undergoing any decomposition or degradation in quality. Also, the material should be one that undergoes a relatively rapid change in oxidation state once voltage is applied; preferred switching speeds are from about 50 nanoseconds to about 1 millisecond for a 50 micron by 50 micron pixel. Examples of suitable electrochromic materials include phthalocyanines, anthraquinones, materials containing a transition metal element, including the elements of the Lanthanide and Actinide series, such as transition metal oxides, transition metal sulfides, transition metal oxysulfides, transition metal halides, transition metal nitrides, chromates, molybdates, tungstates, vanadates, niobates, tantalates, titanates, copper stannate, tungsten oxide, molybdenum oxide, titanium oxide, vanadium oxide, niobium oxide, cerium oxide, MnO, NiO, CoO, and other metal oxides of the formula MO, wherein M represents a metal ion, metal oxides of the formula $M_2O_3$, such as $Cr_2O_3$, $Fe_2O_3$, $Y_2O_3$, $Yb_2O_3$, $Ti_2O_3$, and $Mn_2O_3$, metal oxides of the formula $MO_2$, such as $TiO_2$, $ThO_2$, and $CrO_2$, metal oxides of the formula $M_3O_4$, such as $Co_3O_4$, $Mn_3O_4$, and $Fe_3O_4$, metal oxides of the formula $MO_3$, such as $CrO_3$, $MoO_3$, $WO_3$, and $UO_3$, metal oxides of the formula $M_2O_5$, such as $V_2O_5$, $Nb_2O_5$, and $Ta_2O_5$, metal oxides of the formula $M_4O_6$, metal oxides of the formula $M_2O_7$, complex metal oxides of the formula $XYO_2$, wherein X and Y are different metals, such as $LiNiO_2$, $XYO_3$ oxides, such as $LiMnO_3$, $FeTiO_3$, $MnTiO_3$, $CoTiO_3$, $NiTiO_3$, $LiNbO_3$, $LiTaO_3$, and $NaWO_3$, $XYO_4$ oxides, such as $MgWO_4$, $CdWO_4$, and $NiWO_4$, $XY_2O_6$ oxides, such as $CaNb_2O_6$, $X_2Y_2O_6$ oxides, such as $Na_2Nb_2O_6$, $X_2YO_4$ oxides, such as $Na_2MoO_4$, $Ag_2MoO_4$, $Cu_2MoO_4$, $Li_2MoO_4$, $Li_2WO_4$, $Sr_2TiO_4$, and $Ca_2MnO_4$, $XY_2O_4$ oxides, such as $FeCr_2O_4$ and $TiZn_2O_4$, metal oxides of the formula $X_2YO_5$, such as $Fe_2TiO_5$ and $Al_2TiO_5$, hydrates of certain metal oxides, such as $WO_3.H_2O$, $WO_3.2H_2O$, $MoO_3.H_2O$, and $MoO_3.2H_2O$, cobalt tungstate, metal molybdates, metal titanates, metal niobates, and the like, and mixtures thereof.

Particularly preferred as electrochromic materials for the imaging bar of the present invention are phthalocyanines, especially lanthanide diphthalocyanines, and anthraquinones. Examples of suitable phthalocyanines include 2(3), 6(7), 10(11), 14(15)-tetratertiarybutyl phthalocyanines (also referred to as $(4\text{-}t\text{-}butyl)_4H_2Pc$), 2(3), 6(7), 10(11), 14(15)-tetrachloro phthalocyanine (also referred to as (4-Cl)$_4$H$_2$Pc), bis(phthalocyaninato) neodymium(III) (also referred to as neodymium diphthalocyanine), bis(phthalocyaninato) neodymium(IV) (also referred to as oxidized neodymium diphthalocyanine), bis(phthalocyaninato) lutetium(III) (also referred to as lutetium diphthalocyanine), bis(phthalocyaninato) ytterbium(III) (also referred to as ytterbium diphthalocyanine), and the like. The above named compounds are based on the following phthalocyanine numbering system:

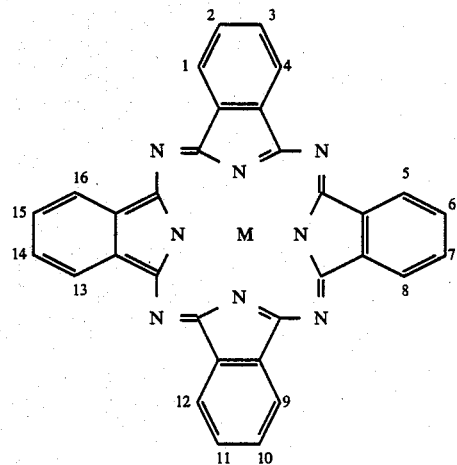

wherein M is either H$_2$ or a divalent metal.

Suitable anthraquinones include 1,4-diamino-2,3-dicyanoanthraquinone, 1,8-diamino-4,5-dihydroxyanthraquinone, 1,4,5,8-tetraaminoanthraquinone, and the like. Also, polymeric materials such as polypyrrole and poly 3-methyl thiophene and others produced by electropolymerization and capable of subsequent reversible reduction and oxidation have been observed to provide electrochromic materials suitable for the present invention. The above named compounds are based on the following anthraquinone numbering system:

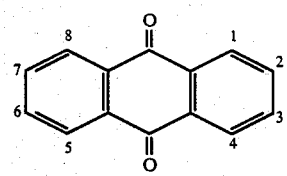

In addition, the multiple reduction-oxidation states of lanthanide diphthalocyanines may be combined with the stability of electropolymerized polymers to produce electrochromic materials suitable for the present invention. Sulfonated and other anionic lanthanide diphthalocyanines, such as octahydroxy lanthanide diphthalocyanines, can be used as the anion in the electropolymerization of pyrrole or 3-methyl thiophene. In this way, not only can the oxidation-reduction of pyrrole or 3-methyl thiophene be used to switch color, but the multiple oxidation states of the diphthalocyanine can also be used to effect color switching. In particular, anionic lutetium diphthalocyanines are suitable anions to be used in the electropolymerized electrochromic materials suitable for image bars.

The electrochromic films utilized in the imaging bar of the present invention may be prepared by vacuum evaporation deposition techniques. This process entails loading indium-tin oxide (ITO) coated glass substrates into a vacuum system having an evaporation source, such as a quartz crucible inserted into a circular tantalum heater band. Current is passed through the heater band to heat it and the crucible with its contents. After heating to a sufficient temperature, the material in the crucible sublimates and is deposited onto the ITO substrate. The resulting film-coating ITO electrode may then be incorporated into an imaging bar. Alternatively, the electrochromic films utilized in the imaging bar of the present invention may be prepared by Langmuir-Blodgett techniques, which process is disclosed in G. J. Kovacs et al., *Can. J. Phys.*, vol. 63, p. 346-349 (1985). Generally, films comprising anthraquinone electrochromic materials that have been prepared by vacuum evaporation techniques provide superior results as compared to films prepared according to Langmuir-Blodgett techniques with respect to exhibiting reversible oxidation-reduction reactions accompanied by color changes. Langmuir-Blodgett films in general, however, are of superior quality as compared to vacuum evaporation deposited films with respect to film defects such as discontinuities, pinholes, molecular disorder, impurities due to material decomposition, and other defects that can affect the quality of performance of electrochromic films. Electrochromic films suitable for the present invention that have been prepared by either vacuum evaporation deposition or by Langmuir-Blodgett techniques may possess a thickness of from about 10 nanometers to about 1 micron, and preferably from about 100 nanometers to about 1 micron.

Many colors are available for the electrochromic films of the image bar because of the wide variety of colors exhibited by electrochromic materials in their various oxidation states. For some applications, such as single color imaging or highlight color imaging, the colors exhibited by the selected electrochromic material may suffice. In other instances, however, such as when a photoreceptor is sensitive to a particular wavelength of light, or when full color images are prepared, some fine tuning of the colors of the electrochromic film may be desirable.

The color exhibited by a particular material at a given voltage may be controlled by adjusting the pH of the electrolyte in the image bar. For example, a thin electrochromic film of lutetium diphthalocyanine and the electrolyte is aqueous KCl at a 1.0 molar concentration, at pH 1.23, the color of the film is orange at an applied voltage at the electrode of +0.96 V, green at +0.48 V, blue at 0 V, purple at −0.44 V, and violet at −0.96 V. At pH 5.2, the color of the film is orange at +0.96 V, green at +0.48 V, green at 0 V, blue at −0.44 V, and violet −0.96 V. The pH can thus be used to control the color of the material at a given voltage. In addition, the pH can affect the number of colors attainable.

Another method of adjusting the colors that an electrochromic film will exhibit under various electric field conditions is to formulate the film from a mixture of two or more electrochromic materials. For example, a film prepared by the vacuum co-evaporation deposition of 1,8-diamino-4,5-dihydroxyanthraquinone, which exhibits a color of violet when a voltage of 0 V is applied and a color of yellow when a voltage of −1.2 V is applied, and 1,4-diamino-2,3-dicyanoanthraquinone, which exhibits a color of blue-green when a voltage of +1.0 V is applied and a color of red when a voltage of −0.75 V is applied, will result in an electrochromic film that exhibits a color of blue when a voltage of 0 V is applied, a color of red when a voltage of −0.75 V is applied, a color of yellow when a voltage of −1.2 V is applied, a color of red when a voltage of 0 V is applied, a color of blue when a voltage of +1.0 V is applied, and again a color of blue when a voltage of 0 V is applied. A hysteresis effect implies that film color at a given voltage will not always be the same but depends on the direction of voltage scan at that moment. In the present example, the film color is red at 0 V when the voltage scan is in the oxidizing direction and blue at 0 V when the voltage scan is in the reducing direction. The oxidation-reduction potentials of the two materials need not be the same, and each responds independently.

Generally, the voltage applied to each pixel in the image bar ranges from about −3.0 V to about +3.0 V vs. SCE (saturated calomel electrode), and preferably from about −2.5 V to about +2.5 V vs. SCE. The voltage applied depends on the electrochromic material selected for the image bar, the electrolyte, and the electrode materials. To effect a change in oxidation state in the electrochromic material, voltage of a given magnitude is required. For example, to effect a reduction of a thin film of 1,4,5,8-tetraaminoanthraquinone, a potential of about −0.5 volts relative to a saturated calomel electrode (SCE) must be applied; to effect an oxidation of this material, a potential of about +0.55 volts vs. SCE must be applied. The potentials, relative to SCE, required to effect oxidation and reduction of some electrochromic materials in the form of a thin film on an indium-tin oxide electrode, are presented in the table below:

| Electrochromic Material | Reduction Potential | Oxidation Potential | Electrochromic Changes Observed |
| --- | --- | --- | --- |
| 1,4,5,8-tetraamino-anthraquinone film prepared by vacuum evaporation technique | −0.5 | +0.55 | violet→reduction (−0.5 V) to purple purple→oxidation (+0.55 V) to blue-green blue-green→reduction (−0.5 V) to purple |
| 1,4-diamino-2,3-dicyanoanthra-quinone film prepared by vacuum evaporation technique | −0.75 | +1.0 | blue-green→reduction (−0.75 V) to red red→oxidation (+1.0 V) to blue-green |
| (4-Cl)₄H₂-metal free phthalocyanine film prepared by vacuum evaporation technique | −65 | +1.5 | blue-green→reduction (−1.5 V) to purple purple→oxidation (+1.5 V) to blue-green |
| 1,8-diamino-4,5-dihydroxy-anthraquinone film prepared by vacuum evaporation technique | "1.2 | 0 | violet→reduction (−1.2 V) to yellow yellow→oxidation (0 V) to violet |
| 1,8-dinitro-4,5-dihydroxy-anthraquinone film prepared by vacuum evaporation technique | −1.5 | 0 | yellow→reduction (−1.5 V) to dark blue (all of coating removed) |
| Neodymium diphthalo-cyanine film prepared by vacuum evaporation technique | −0.9 | +1.1 | blue-green→reduction (−0.9 V) to dark blue dark blue→oxidation (+1.1 V) to purple purple→reduction (−0.9 V) to dark blue |

The first material, 1,4,5,8-tetraamino anthraquinone, is violet in color as initially deposited. After oxidation, it turns to a blue-green color and then upon reduction it turns purple. After that, it cycles between the blue-green and purple state, and does not return to the initial violet color. Neodymium diphthalocyanine shows similar behavior, initially being blue-green in color, turning dark blue upon reduction, becoming purple upon oxidation, and then cycling between purple and dark blue. The anthraquinones in the table all undergo one electron reduction and switch from the neutral state to the singly reduced state. The 3-methyl thiophene and pyrrole switch from the oxidized state to the neutral state. In the unoxidized state of the neodymium diphthalocyanine, a labile hydrogen should be present in the material as given by the formula $NdHPc_2$, where the valence states are indicated as $Nd^{3+}H^+(Pc)_2{}^{2-}$. The oxidized material has the form $NdPc_2$ with the valence states indicated as $Nd^{4+}(Pc)_2{}^{2-}$ (a neutral molecule). This oxidized material, bis(phthalocyaninato) neodymium-(IV), was used to form the evaporated films for which the switching results are given in the table. During the electrochromic switching shown in the table, the material switches between the forms $Nd(Pc)_2$ and $[Nd(Pc)_2]-$, wherein the valence states in $[Nd(Pc)_2]-$ can be indicated as $Nd^{3+}$ $(Pc)_2{}^{2-}$. For (4-tertiarybutyl)₄H₂Pc, the molecule is oxidized, that is, an electron is removed, and then on reduction the molecule is returned to the neutral state. For (4-Cl)₄H₂Pc, the molecule is reduced, that is, an electron is added, and then on oxidation the molecule is returned to the neutral state. For lutetium diphthalocyanine, the molecule is neutral at 0 V and then is successively singly oxidized (one electron removed) and then doubly oxidized (second electron removed). On sweeping the potential negative, the molecule is neutral at 0 V and then is successively singly reduced (one electron added) and then doubly reduced (second electron added). For all of the examples in the table, the electrolyte is 1.0 molar KCl in water with no pH adjustment, except for the lutetium diphthalocyanine and for the polypyrrole and poly-3-methyl thiophene. For lutetium diphthalocyanine, the electrolyte is 1.0 molar KCl in water with pH 1.23, and for polypyrrole and poly-3-methyl thiophene, the electrolyte is 0.1 molar sodium perchlorate in acetonitrile.

| Electrochromic Material | Reduction Potential | Oxidation Potential | Electrochromic Changes Observed |
| --- | --- | --- | --- |
| evaporation technique | | | (−0.9 V) to dark blue |
| (4-tertiary-butyl)₄H₂-metal free phthalo-cyanine film prepared by vacuum evaporation or Langmuir-Blodgett techniques | 0 V | +1.5 | dark blue→oxidation (+1.5 V) to light blue light blue→reduction (0 V) to dark blue |
| Lutetium diphthalo-cyanine film | −0.44, −0.96 | 0.0, +0.48, +0.96 | blue (0 V)→reduction (−0.44 V) to purple (reversible reaction) |

-continued

| Electrochromic Material | Reduction Potential | Oxidation Potential | Electrochromic Changes Observed |
|---|---|---|---|
| prepared by vacuum evaporation technique | | | purple (0 V)→reduction (−0.96 V) to violet (reversible reaction) blue (0 V)→oxidation (+0.48 V) to green (reversible reaction) green→oxidation (+0.96 V) to orange (reversible reaction) |
| electropolymerized poly 3-methylthiophene film prepared by electropolymerization directly onto electrode with perchlorate anion | +0.1 | +1.3 | blue→reduction (+0.1 V) to red red→oxidation (+1.3 V) to blue |
| electropolymerized polyrrole film prepared by electropolymerization directly onto electrode with perchlorate anion | −1.0 | +0.5 | black→reduction (−1.0 V) to yellow yellow→oxidation (+0.5 V) to black |

Materials that undergo fully reversible color changes are most desirable for image bar applications. Materials which show completely reversible color changes and which are therefore most desirable for image bar applications include bis(phthalocyaninato) neodymium(IV), bis(phthalocyaninato) lutetium(III), 1,4-diamino-2,3-dicyano anthraquinone, 1,4,5,8-tetraamino anthraquinone, and the conducting polymers polypyrrole and poly-3-methyl thiophene.

Figure 6A:
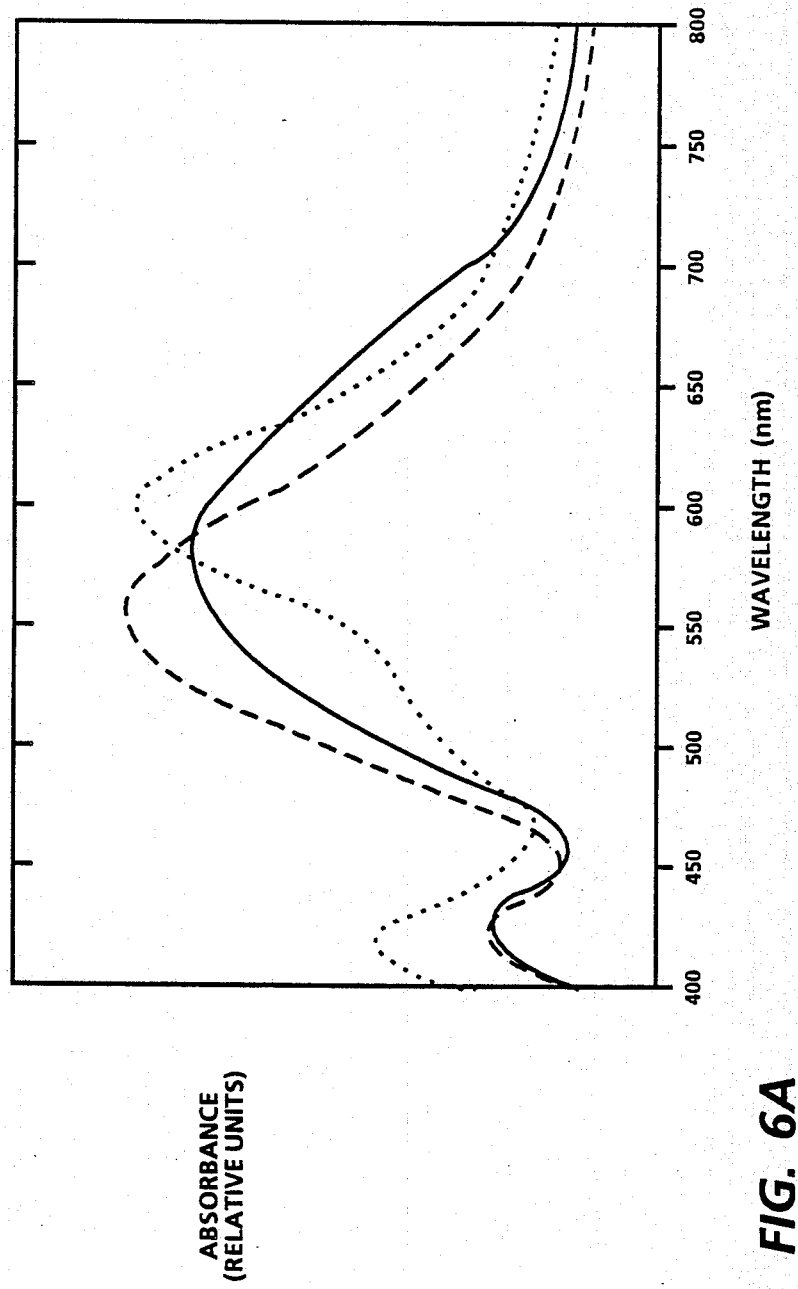

FIGS. 6A through 6K illustrate the changes that occur when the materials listed in the table are subjected to the stated potentials. FIG. 6A represents a visible absorption spectrum of 1,4,5,8-tetraaminoanthraquinone wherein absorbance, which indicates color intensity and is indicated in relative optical density units, and wavelength (nm) are plotted. Prior to the application of any potentials, the material exhibits an absorption peak, represented by a solid line, in the wavelength region of about 575 nanometers, which corresponds to a violet color. Application of a reduction potential of about −0.55 volts reduces the material, resulting in a color change that appears in FIG. 6A as a dashed line with an absorption peak in the wavelength region of about 550 nanometers, which corresponds to a purple color. Application of a potential of +0.55 volts to the reduced material oxidizes it, resulting in a color change that appears in FIG. 6A as a dotted line with an absorption peak in the wavelength region of about 590 nanometers, which corresponds to a blue-green color.

Figure 6B:
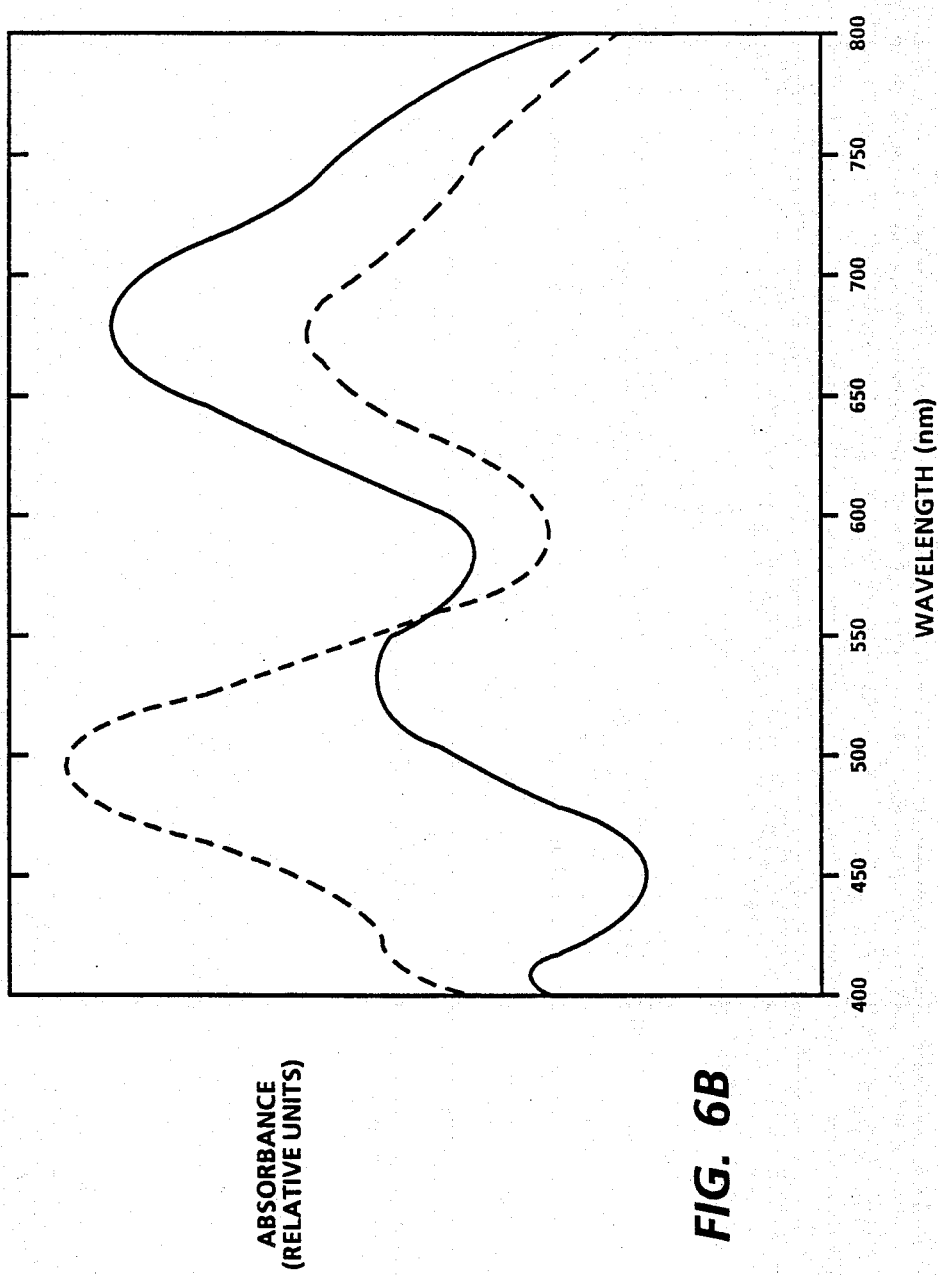

FIG. 6B represents a visible absorption spectrum of 1,4-diamino-2,3-dicyanoanthraquinone. The original material exhibits an absorption peak, represented by a solid line, in the wavelength region of about 675 nanometers, which corresponds to a blue-green color. Application of a −0.75 volt potential reduces the material, inducing a color change which appears in the figure as a dotted line having an absorption peak at about 490 nanometers, which corresponds to a red color. Application of a +1.0 volt potential to the reduced material reverses the process and returns the material to the original color and absorption spectrum as shown by the solid line.

Figure 6C:
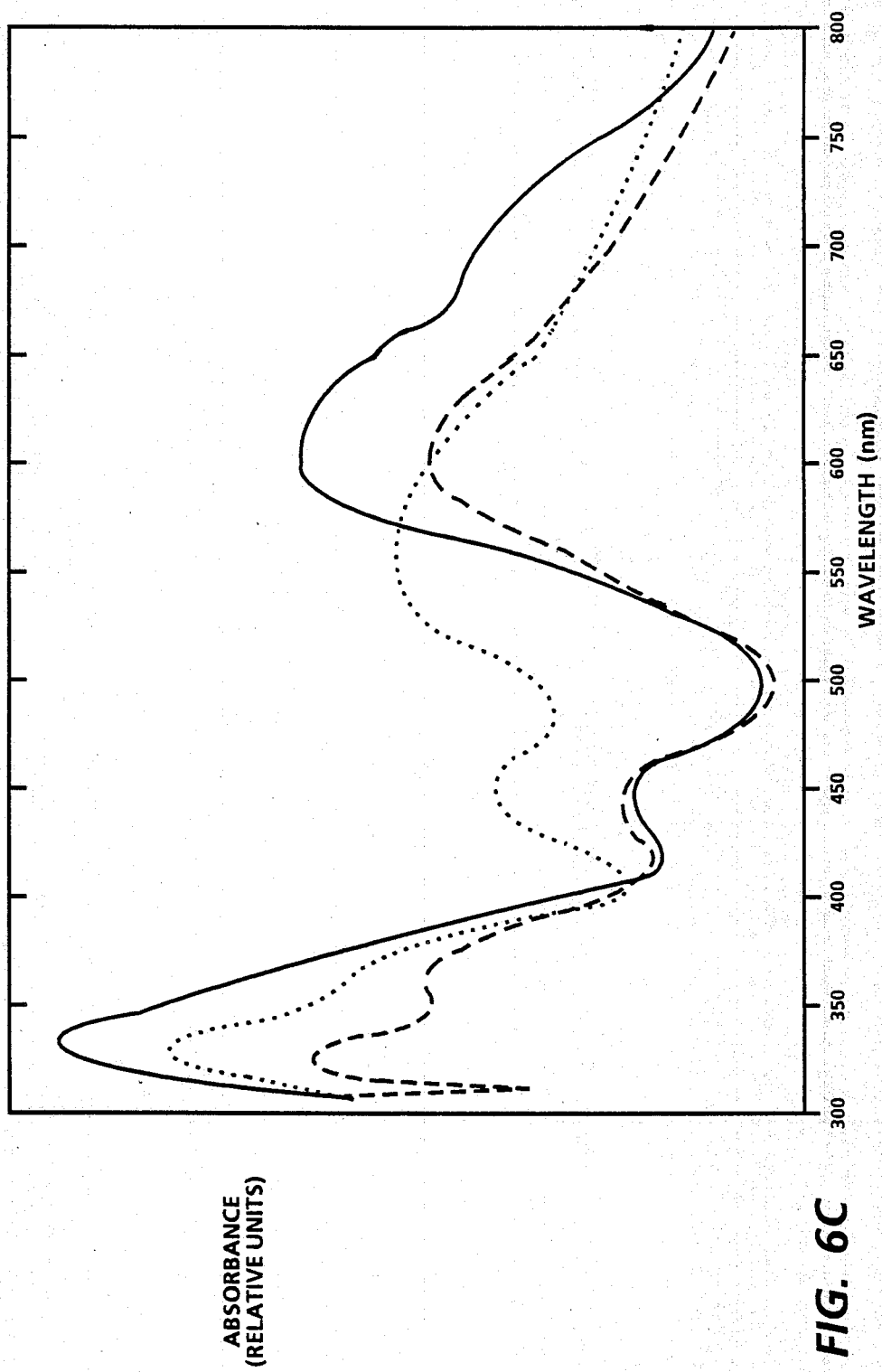

FIG. 6C represents a visible absorption spectrum of 4-tetrachlorophthalocyanine. The original material exhibits a visible absorption spectrum, represented by a solid line, having an absorption peak in the wavelength region of about 610 nanometers, which corresponds to a blue-green color. Application of a −1.5 volt potential reduces the material, inducing a color change which appears in the figure as a dotted line having an absorption peak at about 550 nanometers, which corresponds to a purple color. Application of a +1.5 volt potential to the reduced material reverses the process and produces some of the original material, which exhibits an absorption peak at about 610 nanometers, represented here as a dashed line. The lower absorbance of this peak as compared to that of the starting material indicates that not all of the material was recovered upon reversal of the reduction reaction.

Figure 6D:
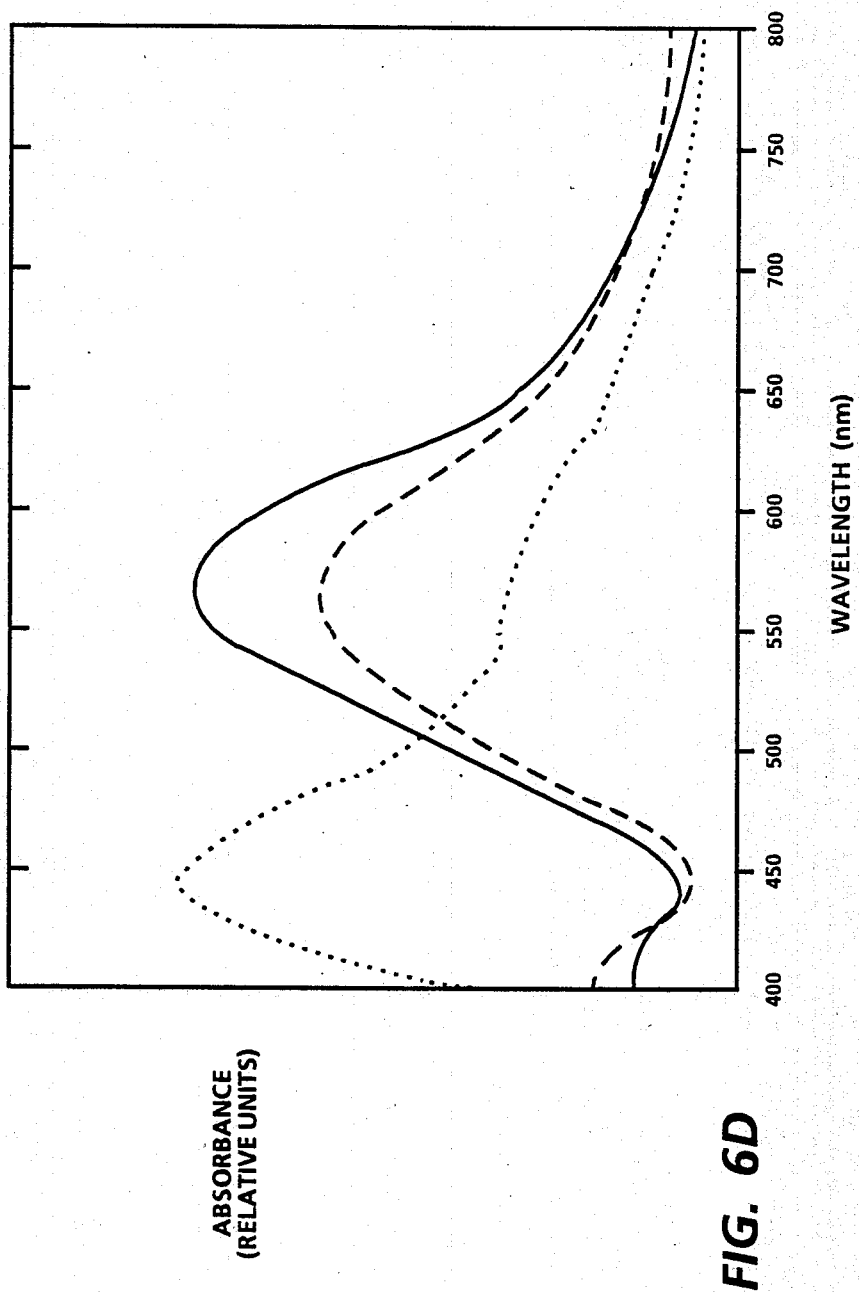

Similarly, FIG. 6D represents a visible absorption spectrum of 1,8-diamino-4,5-dihydroxyanthraquinone, which exhibits an absorption peak, represented by a solid line at about 560 nanometers, corresponding to a violet color. Application of a −1.2 volt potential reduces the material, inducing a color change which appears in the figure as a dotted line having an absorption peak in the 440 nanometer region, which corresponds to a yellow color. Returning the potential to 0 volts on the reduced material reverses the process and produces some of the original material, which exhibits an absorption peak at about 560 nanometers, represented here as a dashed line. The lower absorbance of this peak as compared to that of the starting material indicates that not all of the material was recovered upon reversal of the reduction reaction.

Figure 6E:
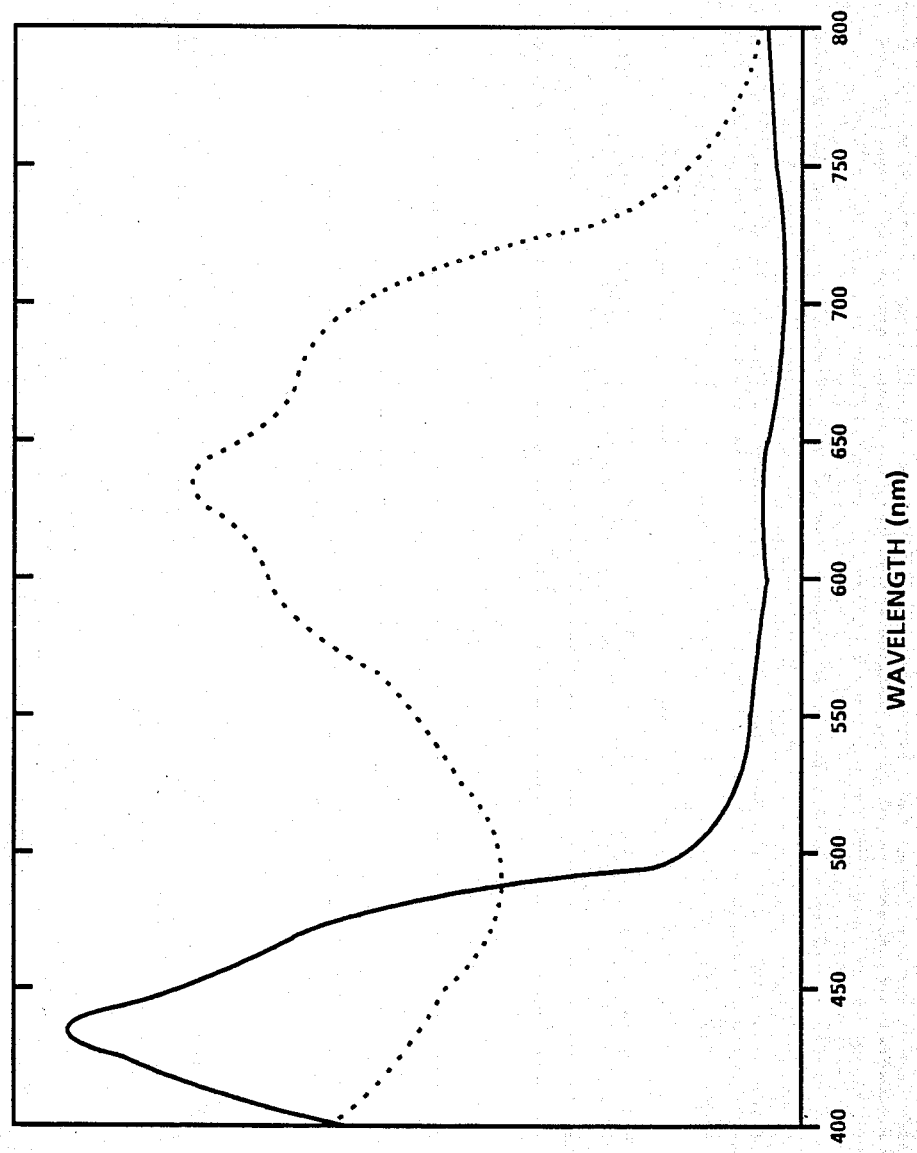

FIG. 6E represents a visible absorption spectrum of 1,8-dinitro-4,5-dihydroxyanthraquinone, which initially exhibits an absorption peak, represented by a solid line, at about 440 nanometers, which corresponds to a yellow color. Upon application of a −1.5 volt potential, the material becomes reduced and undergoes a color change, which appears in the figure as a dotted line having an absorption peak in the 625 nanometer region, which corresponds to a dark blue color.

Figure 6F:
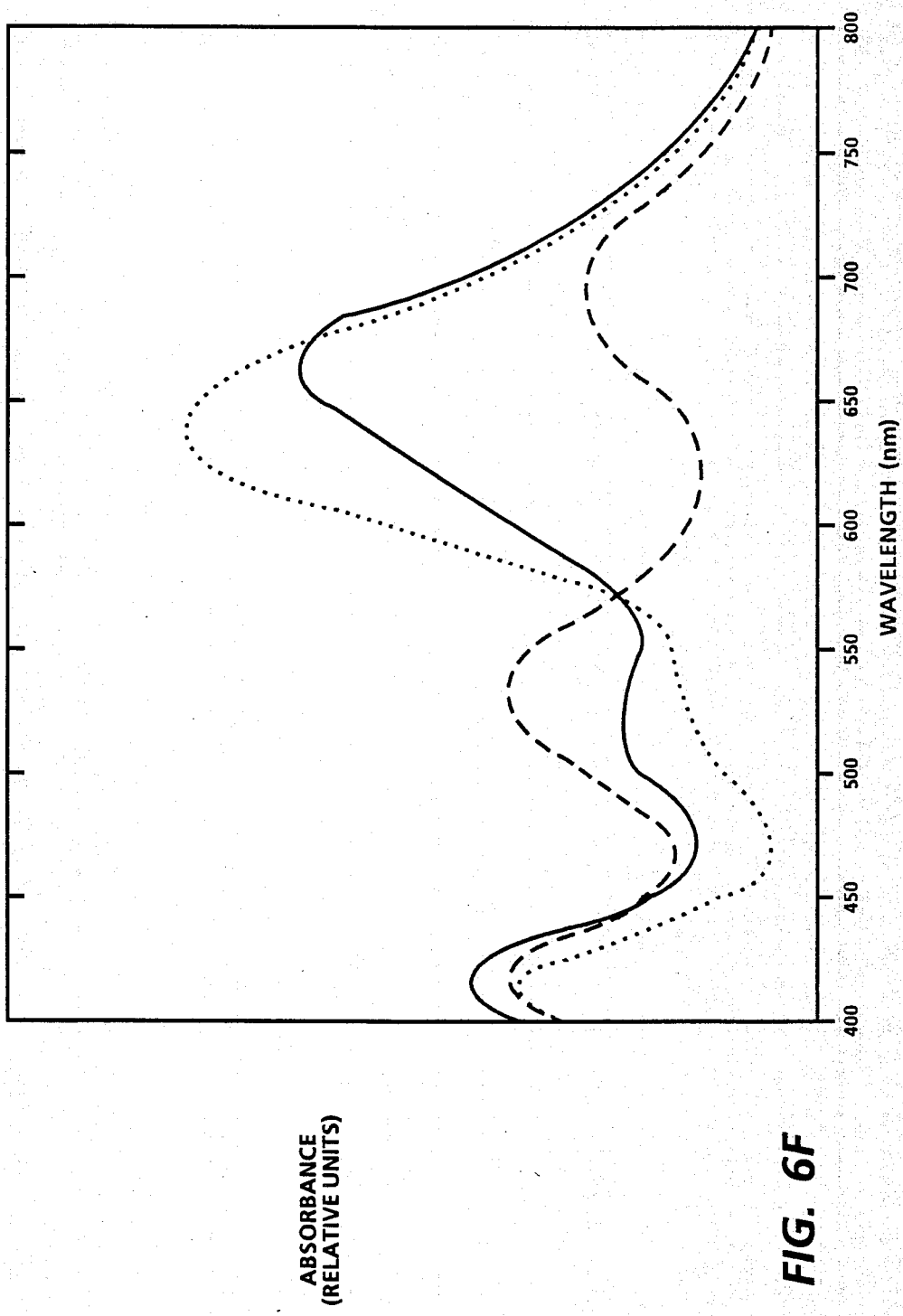

FIG. 6F represents a visible absorption spectrum of neodymium diphthalocyanine, which initially exhibits an absorption peak, represented by a solid line, at about 660 nanometers, which corresponds to a blue-green color. Application of a −0.9 volt potential to the original material reduces the material, inducing a color change which appears in the figure as a dotted line having an absorption peak in the 640 nanometer region, which corresponds to a dark blue color. Application of a +1.1 volt potential to the reduced material oxidizes the material, inducing a color change which appears in the figure as a dashed line having an absorption peak in the 530 nanometer region, which corresponds to a purple color.

Figure 6G:
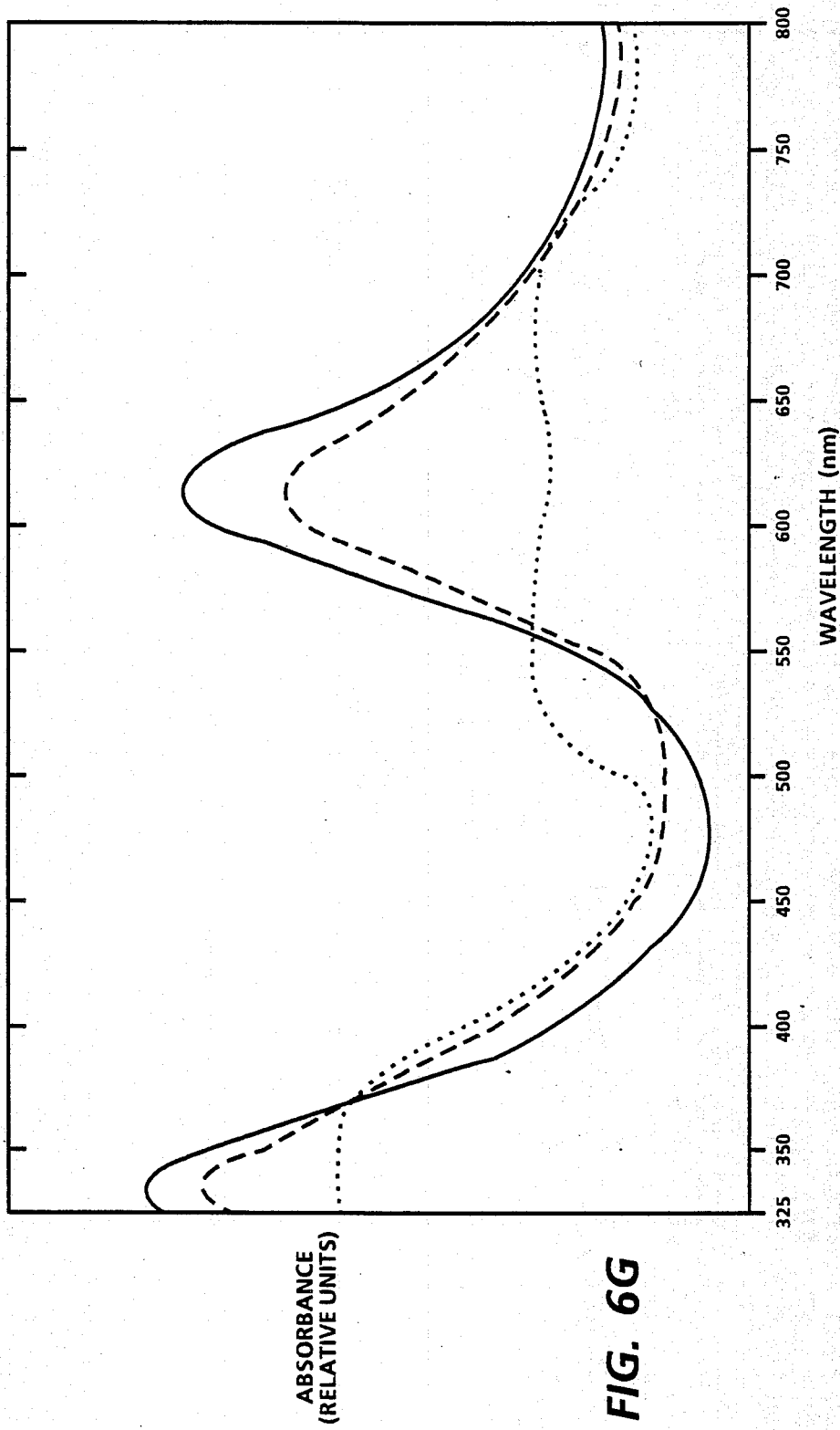

FIG. 6G represents a visible absorption spectrum of (4-tertiarybutyl)4 phthalocyanine, which initially exhibits an absorption peak, represented by a solid line, at about 610 nanometers, corresponding to a dark blue color. Application of a +1.5 volt potential to the original material oxidizes the material, inducing a color change which appears in the figure as a dotted line having an absorption peak in the 550 to 700 nanometer region, which corresponds to a light blue color. Returning the potential to 0 volts on the oxidized material reverses the process and produces some of the original material, which exhibits an absorption peak at about 610 nanometers, represented here as a dashed line. The lower absorbance of this peak as compared to that of the starting material indicates that not all of the material was recovered upon reversal of the oxidation reaction.

Figure 6H:
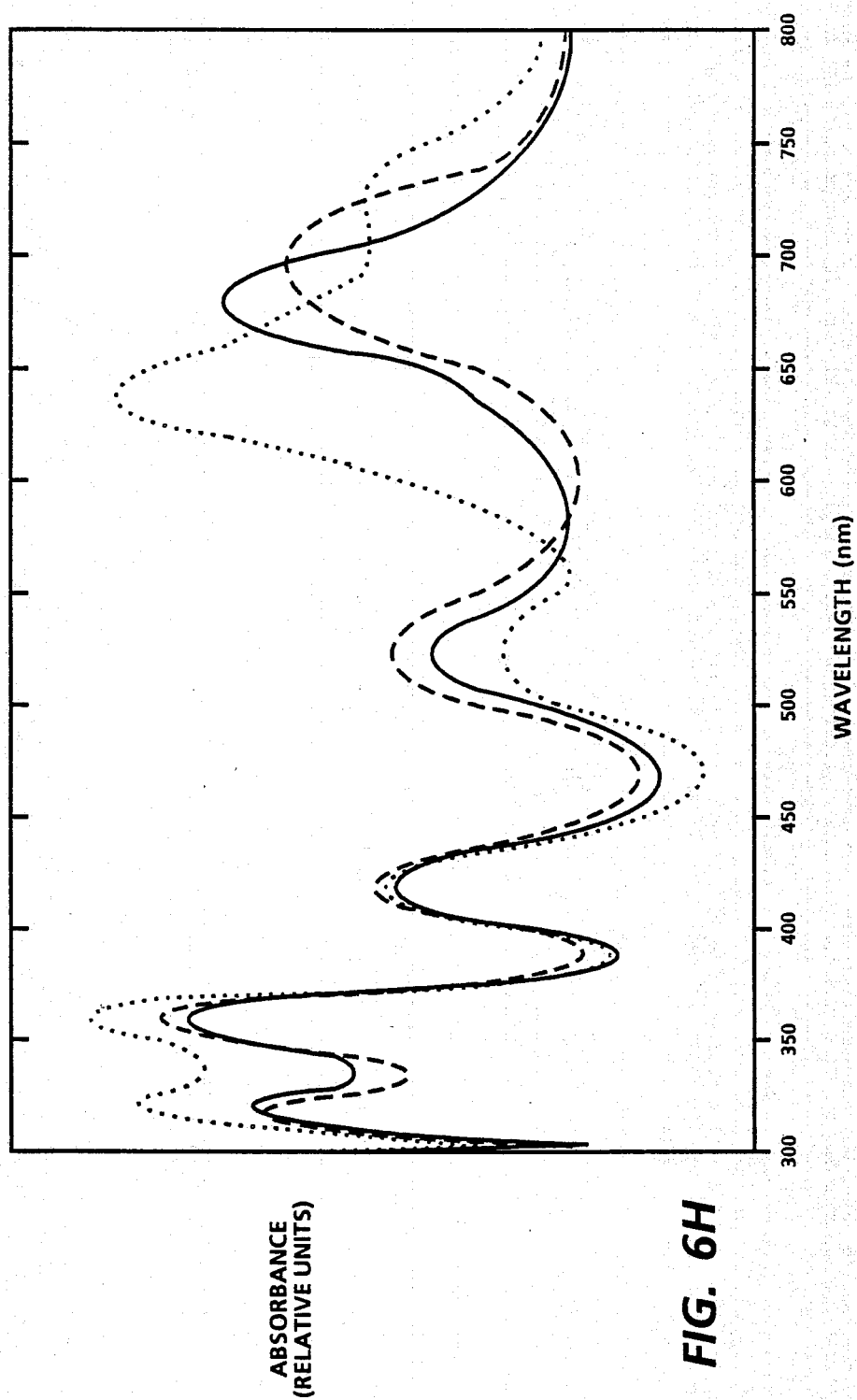
Figure 61:
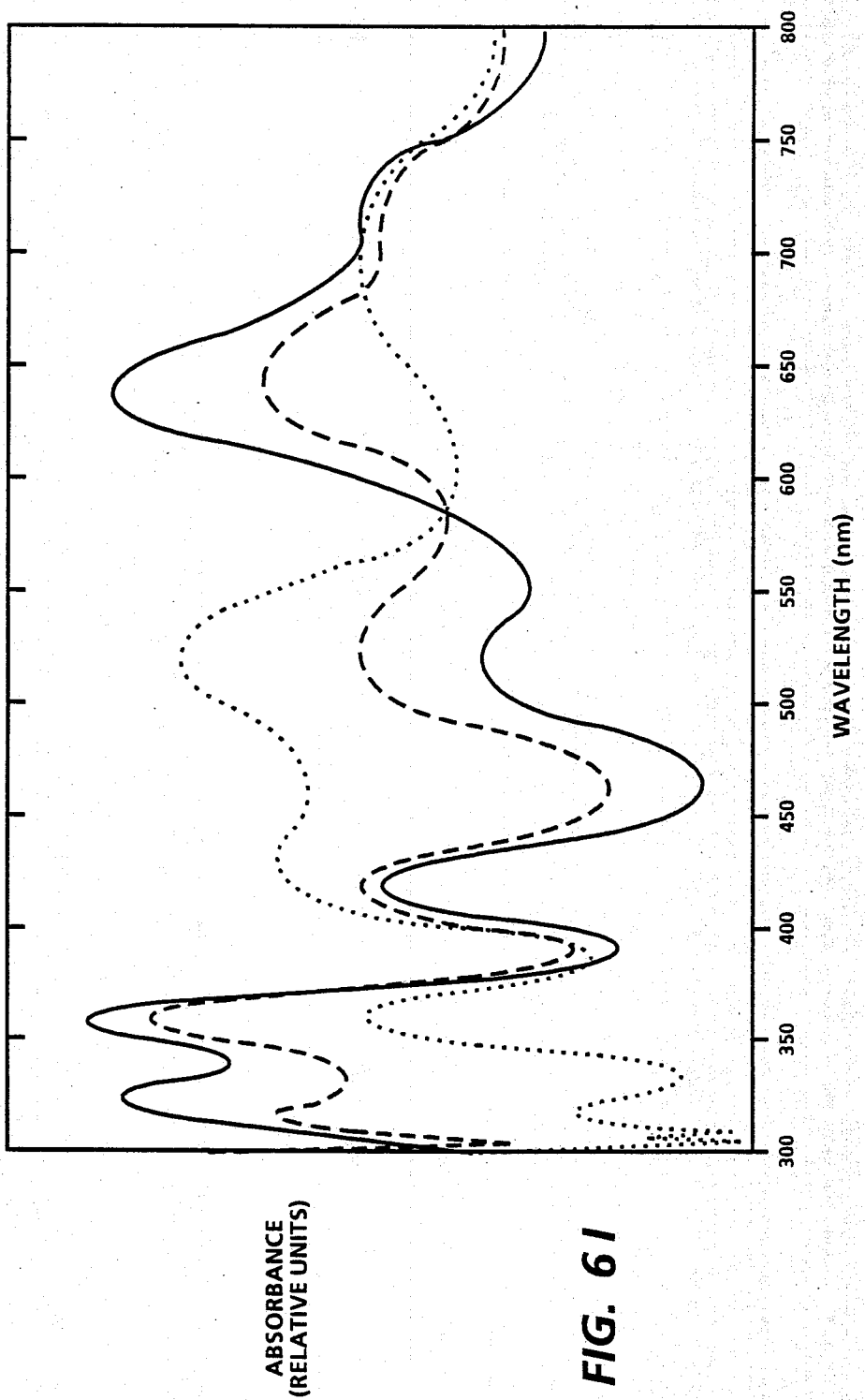

FIGS. 6H and 6I represent visible absorption spectra of lutetium diphthalocyanine. In its original form, the material exhibits an absorption peak, represented by a dotted line in FIG. 6H and by a solid line in FIG. 6I, at about 640 nanometers, which corresponds to a green-blue color. Application of a −0.44 volt potential to the original material reduces the material, inducing a color change which appears in FIG. 6H as a solid line having an absorption peak in the 660 nanometer region, which corresponds to a blue-green color. Application of a −0.96 volt potential to the reduced material further reduces the lutetium diphthalocyanine, inducing a color change which appears in FIG. 6H as a dashed line having an absorption peak in the 690 nanometer region, which corresponds to a blue color. Upon application of a +0.48 volt potential to the original material, the material becomes oxidized and undergoes a color change, which appears in FIG. 6I as a dashed line having absorption peaks in the 640, 520, and 430 nanometer regions, which corresponds to a violet color. Application of a +0.96 volt potential to the oxidized material further oxidizes the lutetium diphthalocyanine, inducing a color change which appears in FIG. 6I as a dotted line having absorption peaks in the 520 and 430 nanometer regions, which corresponds to a purple color.

Figure 6J:
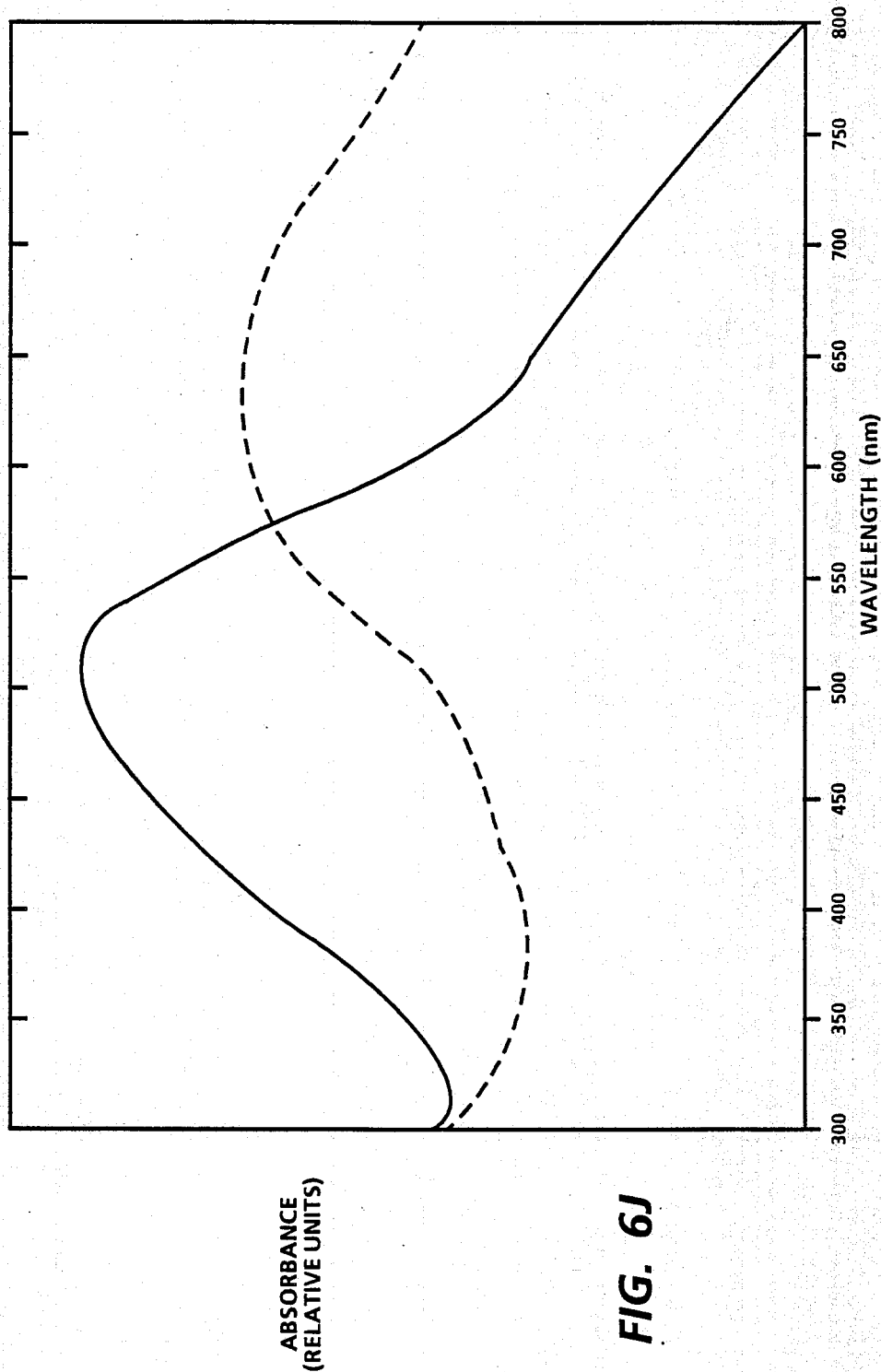

FIG. 6J represents a visible absorption spectrum of electropolymerized poly-3-methylthiophene, which in its reduced state existing at a +0.1 volt potential exhibits an absorption peak, represented by a solid line, at about 510 nanometers, corresponding to a red color. In its oxidized state, which exists at a +1.3 volt potential, the material exhibits an absorption peak, represented by a dashed line, at about 640 nanometers, corresponding to a blue color.

Figure 6K:
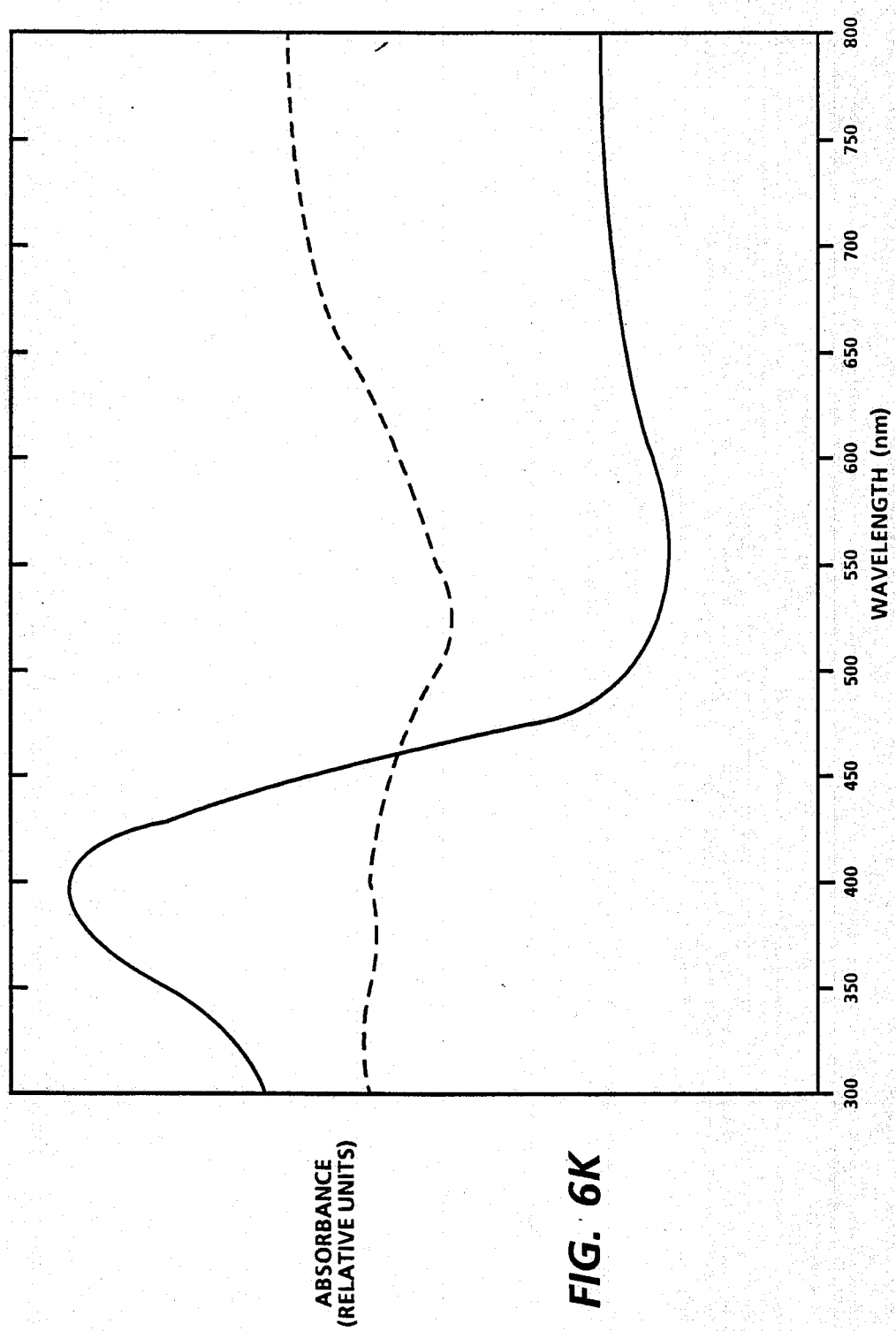

FIG. 6K represents a visible absorption spectrum of electropolymerized polypyrrole, which in its reduced state existing at a −1.0 volt potential exhibits an absorption peak, represented by a solid line, at about 400 nanometers, corresponding to a yellow color. In its oxidized state, which exists at a +0.5 volt potential, the material exhibits no appreciable absorption peaks; the visible spectrum is represented by a dashed line, and corresponds to a black color.

For a 50 micron by 50 micron pixel, the current of the electric field applied to each pixel in the image bar generally is from about 2.5 microamps to about 2.5 milliamps over 1 millisecond to 1 microsecond, and preferably from about 2.5 microamps to about 2.5 microamps over 1 millisecond to 100 microseconds. The total charge passed affects the intensity of the color exhibited by the electrochromic film, since the total charge controls how much of the electrochromic material undergoes an oxidation or reduction. By controlling current, and therefore charge, the color of the electrochromic film may be adjusted to the desired shade.

The image bar of the present invention can be used to produce either monochromatic images or multicolored images. To produce monochromatic images, the image bar may contain an electrochromic film for which one of the oxidation states absorbs light of a certain wavelength, and be used in conjunction with a light source that provides light of that wavelength and a photoreceptor sensitive to that wavelength of light. For example, an electrochromic film may be formulated from a material that in one oxidation state exhibits a red color and in another oxidation state exhibits a blue color, such as poly-3-methyl thiophene as shown in FIG. 6J. An image bar of the present invention containing this film, when used in conjunction with a source of blue light and a photoreceptor that is sensitive to blue light, can produce images by a process wherein the pixels are switched from red to blue. Blue light will not pass through the red areas of the bar and will not discharge those areas of the photoreceptor upon which it falls, while blue light passing through the blue areas of the bar will discharge areas of the photoreceptor upon which it falls. The latent image so produced may then be developed with a developer composition of any color.

Full color images may be produced with the image bar of the present invention by equipping the image bar with electrochromic film of a material having at least three oxidation states, and possibly more, each of which differs markedly in color from the other oxidation states. The bar should be used in conjunction with a photoreceptor that is capable of creating full color images. An example of such a photoreceptor possessing several layers, each of which is sensitive to light of a different wavelength, is disclosed in U.S. Pat. No. 4,308,333, the disclosure of which is totally incorporated herein by reference. Full color images may also be produced with the image bar of the present invention by using a photoreceptor which has a broad spectial response. The image is written three times on the photoreceptor and each time the photoreceptor is successively exposed through a light filter of one color, developed with a developer of the color, transferred to a substrate, and exposed again through a light filter of another color until a multicolored image has been formed. This process is disclosed in U.S. Pat. No. 3,836,244, the disclosure of which is totally incorporated herein by reference. Two-color, that is, highlight color, images may also be produced by an image bar of the present invention by equipping the image bar with electrochromic film of a material having at least two oxidation states, one of which transmits, for example, red light and absorbs blue light, and the other of which is nearly transparent and transmits white light. The bar is preferably used in conjunction with a photoreceptor capable of creating two-color images. An example of such a photoreceptor possessing two photocnductive layers, one of which is sensitive to red light and one of which is sensitive to blue light only and not to red light, is that disclosed in U.S. Pat. No. 4,335,194, the disclosure of which is totally incorporated herein by reference.

In operation, each pixel in these image bars is then addressed electronically to generate in the electrochromic film the desired color. Light passing through the pixels is selectively filtered so that only light of the desired wavelengths reaches the photoreceptor in a given area. The latent image so produced may then be developed with developer compositions of two or more colors. Both full color copies and highlight color copies may be created by this process. Multicolor images may be produced either by laying down the multicolored image on the photoreceptor in a single pass or by a process of creating latent images on the photoreceptor, developing and transferring the images, subsequently generating additional images on the photoreceptor, and subsequently developing these additional images with developer compositions of other colors and transferring them to the substrate upon which the first image is contained, as disclosed in U.S. Pat. No. 3,836,244.

Specific aspects of the invention will now be described in detail. These examples are intended to be illustrative, and the invention is not limited to the materials, conditions, or process parameters set forth in these embodiments. All parts and percentages are by weight unless otherwise indicated.

EXAMPLE I

Preparation of tetratertiarybutyl metal-free phthalocyanine

A 4-tertiary butyl phthalonitrile starting material was prepared as follows. To a magnetically stirred mixture of 266.78 grams (2.51 moles) of o-xylene and 232.54 grams (2.51 moles) of t-butylchloride in a 2 liter conical flask was added 1 gram of ferric chloride. After 3 hours at room temperature, the mixture was filtered by gravity into a 1 liter round bottom flask and distilled. Three fractions were collected and subsequently analyzed by gas liquid chromatography. Fraction A, collected at 150° to 202° C., contained about 65 percent 4-t-butyl-o-xylene (43.48 grams), no o-xylene, and contaminants comprising predominantly t-butylchloride. Fraction B, collected at 203° to 209° C., contained about 87.8 percent 4-t-butyl-o-xylene (128.00 grams) and Fraction C, collected at 209° to 211° C., was 100 percent 4-t-butyl-o-xylene (186.28 grams). Total yield was 357.76 grams (2.206 moles, 87.9 percent yield). Identification of the product was confirmed by IR spectrum.

A 5 liter three-necked flask was then equipped with a condenser, mechanical stirrer, and stopper, and to the flask was added 1,260 milliliters of water, 630 milliliters of concentrated nitric acid, and 184.69 grams (1.139 moles) of 4-t-butyl-o-xylene. The mixture was refluxed for 48 hours and then cooled in ice, after which the pH was adjusted to 13.5 by adding concentrated potassium hydroxide solution. The non-acidic material was removed by three extractions with diethyl ether, after which the pH was adjusted to 0.9 and the oil produced was separated by three 200 milliliter extractions with diethyl ether and evaporation of the ether extracts on a rotary evaporator. A honey colored gum was obtained (164.75 grams, 75.6 percent yield), which was identified by IR spectrum as a mixture of 2-methyl-5-t-butylbenzoic acid and 2-methyl-4-t-butylbenzoic acid.

Subsequently, a 5 liter three-necked flask was then equipped with a condenser, mechanical stirrer, and stopper, and the gum was dissolved in 2,200 milliliters of distilled water containing 88 grams of potassium hydroxide. The solution was placed in the 5 liter flask and brought to reflux. Over a 4 hour period, 360.3 grams (2.28 moles) of potassium permanganate was added to the solution and the mixture was refluxed for an additional 2 hours. Excess permanganate was then destroyed by adding 75 milliliters of methanol, and the hot reaction mixture was suction filtered to remove the brown manganese dioxide. The precipitate was washed three times with water. The pH of the combined filtrates was adjusted to 0.9 with concentrated hydrochloric acid, after which white crystals of the 4-t-butylphthalic acid product formed over a period of 4 to 5 days. The crystals exhibited a melting point of 148° to 150° C. and were formed in an amount of 173.66 grams (0.7814 mole). The identity of the 4-t-butylphthalic acid product was confirmed by IR spectrum.

Subsequently, a 1 liter round bottom flask was fitted with a reflux condenser, to which was added 173.66 grams (0.7814 mole) of 4-t-butylphthalic acid and 500 milliliters of thionyl chloride. The yellow solution was magnetically stirred and refluxed for 3 hours, after which the thionyl chloride was removed from the anhydride under reduced pressure. The resultant white crystalline solid was washed three times with anhydrous hexane and the hexane was removed under reduced pressure to yield 150.33 grams (0.7361 mole) of the 4-t-butyl-phthalic anhydride product, which exhibited a melting point of 77° to 78° C. The identity of the 4-t-butyl-phthalic anhydride product was confirmed by IR spectrum.

Equimolar quantities of 4-t-butylphthalic anhydride (150.33 grams, 0.7361 mol) and urea (44.21 grams) were mixed with a thermometer in a 1 liter round bottom flask. The solids were heated slowly with a Meker burner. At 175° C., the reaction became exothermic and had to be cooled with an air gun. When the exotherm subsided, the temperature was increased to 250° C. and maintained at that temperature for 30 minutes. The flask was then cooled and 300 milliliters of dimethylformamide was added, after which the solution was filtered by gravity to remove any solids which should not dissolve. Water (1 liter) was added, resulting in precipitation of 137.34 grams (0.6757 mole) of 4-t-butyl-phthalimide, which exhibited a melting point of 136.5° to 140° C. The identity of the 4-t-butyl-phthalimide product was confirmed by IR spectrum.

A 4 liter conical flask was then charged with 137.4 grams (0.6757 mole) of 4-t-butylphthalimide and 2 liters of 29 percent ammonium hydroxide solution and the solution was stirred vigorously with a mechanical stirrer. After 3 hours, the creamy suspension was suction filtered and washed with a small amount of water. The faint green powder was dried at 120° C. for one day to yield 134.19 grams of 4-t-butylphthalamide, which exhibited a melting point of 172° to 175° C. The identity of the 4-t-butyl-phthalamide product was confirmed by IR spectrum.

4-t-butylphthalonitrile was prepared by fitting a 500 milliliter three-necked flask with a nitrogen inlet, a 100 milliliter pressure equalizing funnel, and a stopper, placing the flask in an ice bath, and charging the flask with 60 grams (0.2713 mole) of 4-t-butylphthalamide and 400 milliliters of pyridine. The resulting mixture was kept under a constant flow of nitrogen. Phosphorus oxychloride (49.7 milliliters, 0.5426 mole) was placed in the dropping funnel and added slowly to the pyridine solution to keep the temperature at about 4° C. The reaction was magnetically stirred for 4 hours and the mixture was then poured into a beaker containing 200 milliliters of crushed ice. Water was added until the total volume was 1,600 milliliters and a light brown solid was produced. The solid was removed by suction filtration, resulting in 31.24 grams (0.1696 mole) of 4-t-butylphthalonitrile, which exhibited a melting point of 58° to 59° C. The identity of the 4-t-butylphthalonitrile product was confirmed by IR spectrum.

Tetratertiarybutyl metal-free phthalocyanine ((4-t-butyl)₄ phthalocyanine) was then prepared by dissolving 0.64 gram (27.2 milligram atom) in 126 milliliters of amyl alcohol in a 1 liter three-necked round bottom flask, after which 9.0 grams (48.9 millimoles) of 4-t-butylphthalonitrile were added to the sodium amylate solution formed by dissolving the sodium metal in amyl alcohol, and the mixture was refluxed for 5.25 hours. The solution was cooled and diluted with 445 milliliters of methanol, after which 37 milliliters of normal hydrochloric acid were added to the suspension and the suspension was stirred for 16 hours. The reaction mixture was then filtered and the solid blue pigment product obtained was washed in succession with 250 milliliters of methanol, 250 milliliters of water, 250 milliliters of dimethylformamide, and 250 milliliters of methanol to yield 5.28 grams (58.4 percent yield) of the pigment, which was then dried overnight.

The (4-t-butyl)$_4$ phthalocyanine product thus obtained was purified by adding 2.00 grams of the pigment slowly to 50 milliliters of 96 percent sulfuric acid at a temperature of 4° C. The solution was stirred for one hour and then filtered by suction through a sintered glass funnel onto 500 milliliters of ice water with constant mixing, after which the funnel and reaction vessel were washed with 10 milliliters of 96 percent sulfuric acid. Not all of the (4-t-butyl)$_4$ phthalocyanine product was dissolved. The blue solid that appeared in the ice water was filtered off and washed with ten 100 milliliter portions of water. The blue pigment and the pH of the mixture was adjusted to 8.5 by addition of ammonium hydroxide, and the blue solid was then filtered and washed with six 150 milliliter portions of water, and the washings were tested with a barium chloride solution to ensure that the product was washed free of sulfate ions. The product was washed with 1 liter of methanol and dried to yield 1.66 grams (83 percent yield) of a blue solid, which elemental analysis showed to be pure tetratertiarybutyl metal-free phthalocyanine.

EXAMPLE II

Preparation of 1,4-diamino-2,3-dicyano anthraquinone

A 300 milliliter Parr pressure reactor was cooled in a dry ice/isopropanol bath, flushed with dry nitrogen, and charged sequentially with about 15 milliliters of liquid ammonia, 15.0 grams (37 millimoles) of bromaminic acid sodium salt recrystallized from water and dried in high vacuo at 50° C. for 15 hours, 620 milligrams (5 millimoles) of cuprous acetate, and 100 milliliters of formamide. The reactor was sealed and heated to 80° C. and to an internal pressure of 80 pounds per square inch. The reaction mixture was stirred at 80° C. for 9 hours, subsequently cooled to 40° C., and evacuated with a water aspirator for 15 minutes to remove the excess ammonia before being brought to room temperature. Thin Layer Chromatography (on silica gel, with a toluene/methanol eluent in a 4:1 ratio by volume) of the reaction mixture indicated complete disappearance of the orange-red starting material, bromaminic acid.

The resulting violet reaction mixture was transferred into a 500 milliliter three necked round-bottom flask equipped with a thermometer, a condenser, and a magnetic stirrer. Formamide was added until a total volume of 250 milliliters was obtained. To this mixture were added sequentially, 19.6 grams (0.185 moles) of sodium carbonate, 7.6 milliliters (9.1 grams, 0.074 mol) of nitrobenzene, and 10.8 grams (0.222 mol) of sodium cyanide. The reaction mixture was then heated to 80° C. while stirring and kept at this temperature until complete disappearance of starting material occured (as indicated by TLC).

The reaction mixture was then filtered while hot, and the precipitate was washed first with cold formamide until the filtrate was nearly colorless, and then with boiling water (about 300 milliliters) until the filtrate was colorless. It was dried overnight to give 1,4-diamino-2,3-dicyanoanthraquinone (7.8 grams, 73%) as a fine, dark, reddish-blue solid. A solution of the 1,4-diamino-2,3-dicyano anthraquinone in acetonitrile exhibited a peak absorption ($\lambda$max) of 623 nanometers.

EXAMPLE III

Preparation of electropolymerized polypyrrole

A solution of 0.25 Molar pyrrole with 0.1 Molar sodium perchlorate in acetonitrile was placed in an electrochemical cell. The working electrode was a glass strip coated with a clear conductive coating of ITO (Indium Tin Oxide), the counterelectrode was a platinum wire, and the reference electrode was a saturated calomel electrode (SCE). The cell was purged of oxygen by bubbling argon gas through the solution. Subsequently, the working electrode was run anodically in the range of +0.9 Volts to +1.0 V vs SCE, during which time a polypyrrole film formed on the ITO electrode. When it was first formed, the film was in its oxidized form and appeared black. Once the film was grown to sufficient thickness of about 1 micron, the electrodes were removed from the solution while maintaining the anodizing voltage so that current continued to flow until the electrodes left the solution.

EXAMPLE IV

Preparation of electropolymerized poly 3-methyl thiophene

A solution of 0.25 Molar 3-methyl thiophene with 0.1 Molar sodium perchlorate in acetonitrile was placed in an electrochemical cell. The working electrode was a glass strip coated with a clear conductive coating of ITO (Indium Tin Oxide), the counterelectrode was a platinum wire, and the reference electrode was a saturated calomel electrode (SCE). The cell was purged of oxygen by bubbling argon gas through the solution. Subsequently, the working electrode was run anodically at +2.0 Volts vs SCE, during which time a poly 3-methyl thiophene film formed on the ITO electrode. Once the film was grown to sufficient thickness of about 1 micron, the electrodes were removed from the solution while maintaining the anodizing voltage so that current continued to flow until the electrodes had left the solution.

EXAMPLE V

Preparation of oxidized neodymium diphthalocyanine

Neodymium diphthalocyanine was synthesized from neodymium acetate and o-phthalonitrile by mixing together 5.0 grams (0.0147 mole) of Nd($C_2H_3O_2$)$_3$. $H_2O$ powder and 15.1 grams (0.1179 mole) of phthalonitrile powder in a 500 milliliter three-necked flask equipped with a glass stirrer and a condenser. The mixture was melted and heated for 3 hours at 290°–300° C., after which a blue material was obtained. The product was dissolved in 125 milliliters of dimethyl formamide and the insoluble material was filtered off, after which the remaining solution of blue material was added to 1 liter of distilled water to precipitate out the crude neodymium diphthalocyanine (12 grams) which was collected on filter paper. One gram of the crude neodymium diphthalocyanine was then dissolved in 125 milliliters of dimethylformamide. The solution was run through a silica gel column (3.5 cm$\phi \times$ 60 cm) initially filled with methanol solvent. An azure material came out with the methanol solvent, and a green impurity remained in the column. The azure material was then passed through another column of silica gel and collected in three fractions, of which the first two contained pure neodymium diphthalocyanine as identified by the UV-Visible spectrum of the product in dimethyl formamide (DMF), which exhibited a peak absorption ($\lambda$max) of 634 nanometers. The third fraction contained impurities and was discarded. Subsequently, the first two fractions were dried in a rotary evaporator to yield 0.100 gram of pure neodymium diphthalocyanine.

Oxidized neodymium diphthalocyanine was then synthesized electrochemically from neodymium diphthalocyanine in dimethylformamide containing 1 percent hydrazine hydrate. The electrolysis was carried out at an initial current density of 0.8 milliamperes per square centimeter for 24 hours in a cell equipped with a platinum mesh anode and a platinum plate cathode. Oxidized neodymium diphthalocyanine crystals were deposited at the bottom of the anode, which crystals were collected by filtration and washed with acetone. The visible absorption spectrum of oxidized neodymium diphthalocyanine was measured and found to be different from that of neodymium diphthalocyanine ($\lambda$max=670 nanometers in DMF). In addition, the absorption spectrum of the unoxidized neodymium diphthalocyanine in benzene solution exhibited absorption maxima at 670 nanometers and 325 nanometers, and the absorption spectrum of the oxidized neodymium phthalocyanine in benzene solution exhibited absorption maxima at 662 nanometers, 580 nanometers, and 330 nanometers. The oxidized neodymium diphthalocyanine also exhibited an intense ESR absorption, confirming that it was the oxidized material.

EXAMPLE VI

Preparation of lutetium diphthalocyanine

Lutetium diphthalocyanine was prepared by mixing 1.00 gram (2.8 millimoles) of anhydrous lutetium acetate, available from Johnson-Matthey, and 2.97 grams (5.7 millimoles) metal-free phthalocyanine, available from Eastman Kodak Co., in 40 milliliters of quinoline (dried over 4 Angstrom molecular sieves) in a 200 milliliter three-necked flask fitted with a mechanical stirrer, condenser, and gas inlet tube. The mixture was heated at reflux for 22 hours under a nitrogen atmosphere, after which UV-visible spectroscopic examination of aliquots of the mixture diluted in methylene chloride indicated the formation of the desired product. The resultant suspension was diluted with 200 milliliters of methylene chloride and was then filtered with a sintered glass funnel. The collected solid metal free phthalocyanine was washed with about 100 milliliters of methylene chloride until the filtrate was no longer green in color. Subsequently, the methylene chloride was removed from the filtrate with a rotary evaporator and the residual quinoline suspension was transferred to a Petri dish. Removal of the quinoline at 100° C. in a vacuum oven yielded 0.30 gram (about 9 percent yield) of lutetium diphthalocyanine.

EXAMPLE VII

Preparation of thin films by vacuum evaporation techniques

Thin films of electrochromic materials were prepared by vacuum evaporation. Indium-tin oxide (ITO) coated glass substrates were loaded in a Vacuum Generators Model DPUHV12 vacuum system at a distance of about 0.4 meters from the evaporation source, which consisted of a quartz crucible of about 1 inch in diameter by 1 inch in height inserted into a circular tantalum heater band. Current was passed through the heater band to heat it and the crucible containing the material to be evaporated into a thin film. After heating to a sufficient temperature, the material sublimated and was deposited onto the ITO substrate. The temperatures to which the materials were heated to effect sublimation are as follows:

| MATERIAL | TEMPERATURE |
| --- | --- |
| (4-t-butyl)$_4$H$_2$P$_c$ | 250° C. |
| 1,8-diamino-4,5-dihydroxyanthraquinone | 100° C. |
| 1,4,5,8-tetraamino anthraquinone | 120° C. |
| 1,4-diamino-2,3-dicyanoanthraquinone | 100° C. |
| 1,8-dinitro-4,5-dihydroxyanthraquinone | 100° C. |
| 4,8-dinitro-1,5-dihydroxyanthraquinone | 90° C. |
| (4-Cl)$_4$P$_2$ | 275° C. |
| Neodymium diphthalocyanine | 400° C. |
| Lutetium diphthalocyanine | 400° C. |

EXAMPLE VIII

Preparation of thin film by Langmuir-Blodgett techniques

Langmuir-Blodgett films of tetratertiarybutyl metal-free phthalocyanine ((t-butyl)$_4$H$_2$Pc) were prepared by dissolving the material in Eastman Kodak ACS SpectroGrade toluene to form a solution of about $6.65 \times 10^{-4}$ Molar concentration. The subphase used was water filtered through a Milli-Q system and subsequently distilled and cooled to room temperature. A circular Langmuir trough housed in a glove box on a Terrazzo vibration-free table was used for film compression, and transfer was performed by a vertical dipping device. About 50 microliters of solution was spread onto about 300 square centimeters of trough area. After about 5 minutes, the toluene had evaporated and the film was then compressed at about 0.06 to about 0.15 square Angstroms per molecule per second (about 0.12 to about 0.30 square centimeters per second) until a film pressure of about 10 dynes per centimeter was reached. Prior to spreading, indium-tin oxide coated glass substrates were cleaned in chromic acid, rinsed with distilled water, and inserted vertically into the subphase. These substrates were then withdrawn at a constant speed of about 3.8 millimeters per minute while the surface pressure was maintained constant at about 10 dynes per centimeter. Z-type deposition was observed, that is, a monolayer of (t-butyl)$_4$H$_2$Pc was transferred to the substrate on each withdrawal from the subphase. Multilayers were made by cleaning the water surface after substrate withdrawal and re-inserting the substrate before a new monolayer was spread.

EXAMPLE IX

An electrochromic image bar is fabricated by preparing a linear array of indium tin oxide (ITO) electrodes and incorporating the array into an electrochromic cell with lutetium diphthalocyanine (Lu(Pc)$_2$) as the electrochromic material.

The first step in the fabrication process consisted of producing the linear array of transparent conducting ITO electrodes (with leads) that forms the array of back contacts of the electrochromic cells. The ITO array consists of 80 micron by 80 micron square ITO pixels separated by 5 micron gaps over a length of 25 millimeters, with a total of 294 pixel elements. Each electrode pixel is contacted by its own ITO conductive strip, or lead, 10 microns in width, which is connected to the driver electronics. The ITO coating on the plate is measured at about 8 $\Omega/\square$ (ohms per square). This array forms the back contact of the electrochromic cell.

To produce the ITO array, a projection mask made from a chromium coating on a 2 inch by 2 inch by 1/16 inch glass substrate is first fabricated. The mask pattern is of the same dimension as the desired ITO pattern so that 1:1 projection optics are used to project the mask onto the substrate for the electrode array. To fabricate the mask, the desired electrode pattern is first composed on a Xerox 6085 ® workstation using a Xerox software package called Chipwich. The generated pattern is loaded onto a standard 5¼ inch floppy disk.

Mask manufacture then takes place as follows. A continuous vacuum deposited chromium film on the 2 inch by 2 inch by 1/16 inch glass substrate is coated with an electron resist. The floppy disk with the desired computer generated pattern is loaded onto a computer controlled electron beam writing unit which exposes the electron resist to the electron beam according to the desired pattern. The resist is then developed to form a resist pattern which is the negative of the electrode pattern. Those areas of the chromium film uncovered by resist are subsequently etched away by exposure to acid etchants. After washing, the resist itself is stripped off by heating the entire mask to 300° C. for three hours in an oxygen atmosphere. This process results in a chromium film pattern on glass, which is the negative of the desired electrode pattern. Masks prepared by this process can be obtained by sending a floppy disk containing the electrode pattern to a mask manufacturer such as Abek Scientific Incorporated (815 North Wooten Road, Colorado Springs, Colorado 80915).

The chromium mask is then used for projection photolithography. A 2 inch×2 inch×0.048 inch glass substrate of Corning 7050 glass is precleaned in chromic acid and then rinsed copiously with distilled water. After drying, the glass substrate is spin coated with a positive photoresist Shipley 1400. The photoresist coating is then exposed to the negative mask pattern in a Perkin-Elmer Micralign scanning projection printer, which uses 1:1 projection optics. Exposed areas of the photoresist correspond to light areas of the mask. These areas are subsequently removed from the substrate by washing it in Shipley Microposit Resist Developer provided by the manufacturer. Additional information on the use of the Perkin-Elmer Micralign scanning projection printer, the use of positive photoresist and on the microlithographic process in general can be found in L. F. Thompson, C. G. Willson and M. J. Bowden, "Introduction to Microlithography: Theory Materials and Processing", ACS Symposium Series 219 (Washington, 1983) page 20 ff, page 107 ff, the disclosure of which is totally incorporated herein by reference. The negative chromium mask thereby produces a negative photoresist pattern on the glass substrate, which pattern is cured by baking it at 150° C. for 30 minutes.

This photoresist pattern then acts as a contact mask during sputter deposition of the ITO electrode array. ITO is sputtered to a thickness of 150 nanometers through the resist mask onto the glass substrate. Sputtering is performed in a Perkin-Elmer randex, r.f. diode sputtering system Model 3140. The 6 inch diameter circular target of ITO is applied by Perkin-Elmer and is composed of indium oxide (90 percent) and tin oxide (10 percent). Subsequently, the vacuum chamber is pumped to a pressure of $5 \times 10^{-7}$ torr, and a controlled flow of argon gas (99.99 percent) is introduced to bring the background pressure to 50 millitorr. An r.f. glow discharge is then initiated with a target voltage of 1,300 volts and a power density of 1.1 watts/cm$^2$, which results in a deposition rate of 100 Angstroms per minute. The resist pattern and ITO covering it is then washed off with Shipley Photoresist remover, a solvent provided by the manufacturer, leaving the desired positive ITO electrode pattern on the glass substrate.

Subsequently, a 100 nanometer thick layer of lutetium diphthalocyanine is vacuum evaporated from a quartz crucible through a contact mask mechanically cut from a sheet of 5 mil polyester with a 1 millimeter by 26 millimeter opening to cover continously and completely the linear array of electrodes. An electrochromic cell is then prepared by placing a 2 inch by 2 inch by 1/16 inch unetched ITO plate, commercially available from PPG Industries, Pittsburgh, a distance of about 0.5 millimeters from the etched plate with the Lu(Pc)$_2$ layer. The 0.5 millimeter gap between the plates is filled with a 1.0 Molar potassium chloride electrolyte at pH 1.23. A seal is formed with a thin circular Viton ® gasket squeezed between the plates to keep in place the liquid electrolyte. The leads or conductive strips of the etched ITO array are connected at the edge of the plate to the driver electronics.

Light of wavelength of about 465 nanometers is obtained from a pulsed xenon cylindrical light source in conjunction with a narrow band pass filter. The light is focused through a cylindrical lens system onto the electrochromic cell. Light passing through the cell is then passed through another cylindrical lens onto a selenium photoreceptor precharged to about +800 volts. The light is shuttered through the electrochromic cell by oxidizing selected areas of the Lu(Pc)$_2$ layer by applying a potential of about +5 volts to the working electrode pixels relative to the common counterelectrode. Oxidation of the Lu(Pc)$_2$ layer results in a high absorption of the light at 465 nanometers, which prevents the light from passing through the electrochromic cell at these areas. Light passing through the cell thus reaches the photoreceptor in an image pattern, forming a latent image. The image bar with the above recited dimensions images the photoreceptor in a 1 inch strip. Areas of the image bar that had previously been oxidized are subsequently reduced by application of about −5 volts to the working electrode pixels relative to the common counterelectrode, which enables light of 465 nanometer wavelength to pass through the electrochromic cell. The photoreceptor rotates and thus moves with respect to the image bar. After one rotation of the photoreceptor, the image bar is then stepped over by the length of the pixel array (~25 pmm). An image is then written around the circumference of the photoreceptor at the new position. After 10 rotations and 10 steps of the image bar, 10 adjacent 1 inch strips are imaged. These strips form a full size image. The final latent image is then developed with a black developer comprising 3 parts by weight of a toner and 100 parts by weight of a carrier. The toner comprises 9 percent by weight of Regal 330 ® carbon black and 91 percent by weight of a styrene/n-butylmethacrylate copolymer in which styrene is present in an amount of about 58 percent by weight and n-butylmethacrylate is present in an amount of about 42 percent by weight. The carrier comprises a steel core coated with methyl terpolymer (methyl methacrylate, styrene, triorganosilane) at a coating weight of about 0.6 percent, as disclosed in U.S. Pat. No. 3,526,533, the disclosure of which is totally incorporated herein by reference. Subsequently, the developed image is transferred to paper and permanently fused by heat and pressure, resulting in a black and white image. A writing speed of 2 inches per second is achieved for each inch strip, which results in an overall printing speed of 0.2 inch per second. Image resolution is about 10 line pairs per millimeter and optical density is about 1.4, with no background deposits.

These examples are illustrative in nature and are not intended to limit the scope of the invention. Other embodiments of the present invention may occur to those skilled in the art, and these are included within the scope of the claims.

What is claimed is:

1. An image bar comprising a linear light valve array with a plurality of discrete, independently addressable pixel portions activatable between light transmitting, partially transmitting, and non-transmitting wavelengths by selective application of an electrical field, wherein said pixel portions comprise, in the order stated,
   a first transparent substrate;
   a transparent electrode in contact with said first transparent substrate and connected to a variable current, variable voltage source;
   a single thin film comprising an electrochromic material in contact with said transparent electrode;
   a transparent electrolytic material in contact with said thin film;
   a counterelectrode in contact with said transparent electrolytic material and connected to said variable current, variable voltage source; and
   a second substrate.

2. An improved image bar for an imaging apparatus with a photoconductive member, means for pre-charging the photoconductive member prior to the formation of latent electrostatic images, means for developing the latent images, means for transferring the developed images to substrates, and means for cleaning the photoconductive member prior to pre-charging, the image bar containing at least one row of dot shutters which selectively pass light in response to digitized data signals, during the operating mode of the imaging apparatus, to discharge selectively the pre-charged photoconductive member and thus form the latent images on the photoconductive member line by line, which image bar comprises, in the order stated,
   a first transparent substrate;
   a plurality of transparent electrodes in contact with said first transparent substrate and connected to variable current, variable voltage sources;
   a single thin film comprising an electrochromic material in contact with said transparent electrode;
   a transparent electrolytic material in contact with said thin film;
   a counterelectrode in contact with said transparent electrolytic material and connected to the common terminal of said variable current, variable voltage sources; and
   a second substrate.

3. An image bar comprising a linear light valve array with a plurality of discrete, independently addressable pixel portions activatable between light transmitting, partially transmitting, and non-transmitting wavelengths by selective application of an electric field, comprising:
   a first transparent substrate;
   a second substrate;
   a plurality of first transparent electrodes;
   a second counterelectrode situated between said first and second substrates, such that said first transparent electrodes are situated on said first transparent substrate and said second counterelectrode is situated on said second substrate;
   a single thin film comprising an electrochromic material, said film being situated on said first transparent electrodes; and
   an electrolytic material situated between said thin film and said second counterelectrode; wherein said first transparent electrodes are connected to variable current, variable voltage sources and said second counterelectrode is connected to the common terminal of said variable current, variable voltage sources.

4. An imaging apparatus comprising a photoconductive member; means for pre-charging the photoconductive member prior to the formation of latent electrostatic images; means for developing the latent images with toner particles; means for transferring the developed images to substrates; means for cleaning the photoconductive member prior to pre-charging; an image bar containing at least one row of dot shutters which selectively pass light in response to digitized data signals, during the operating mode of the imaging apparatus, to discharge selectively the pre-charged photoconductive member and thus form the latent images on the photoconductive member line by line, said image bar comprising, in the order stated, a first transparent substrate, a plurality of transparent electrodes in contact with said first transparent substrate and connected to variable current, variable voltage sources, a single thin film comprising an electrochromic material in contact with said transparent electrodes, a transparent electrolytic material in contact with said thin film, a counterelectrode in contact with said transparent electrolytic material and connected to the common terminal of said variable current, variable voltage sources, and a second transparent substrate in contact with said counterelectrode; means for illuminating elements of said array with light; and addressing means for activating predetermined of said array pixels during a line exposure period in accordance with pixel transmission information of a line of the image to be reproduced.

5. An imaging apparatus comprising: a photoconductive member; means for pre-charging the photoconductive member prior to the formation of latent electrostatic images; means for developing the latent images with toner particles; means for transferring the developed images to substrates; means for cleaning the photoconductive member before it is pre-charged; an image bar containing at least one row of dot shutters which selectively pass light in response to digitized data signals, during the operating mode of the imaging apparatus, to discharge selectively the pre-charged photoconductive member and thus form the latent images on the photoconductive member one line at a time, said image bar comprising, a first transparent substrate, a second substrate, a plurality of first transparent electrodes and a second counterelectrode situated between said first and second substrates, such that said first transparent electrodes are situated on said first transparent substrate and connected to variable current, variable voltage sources, and said second counterelectrode is situated on said second substrate and connected to the common terminal of said variable current, variable voltage sources, a single thin film comprising an electrochromic material, said film being situated on said first transparent electrode, and an electrolytic material situated between said thin film and said second counterelectrode; means for illuminating elements of said array with light; and addressing means for activating predetermined of said array pixels during a line exposure period in accordance with pixel transmission information of a line of the image to be reproduced.

6. An image bar in accordance with claims 1, 2, or 3 wherein said counterelectrode is transparent.

7. An imaging apparatus in accordance with claims 4 or 5 wherein said counterelectrode is transparent.

8. An image bar in accordance with claims 1, 2, or 3 wherein said second substrate is transparent.

9. An imaging apparatus in accordance with claims 4 or 5 wherein said second substrate is transparent.

10. An image bar in accordance with claims 1, 2, or 3 wherein said image bar operates by means of DC voltage.

11. An imaging apparatus in accordance with claims 4 or 5 wherein said image bar operates by means of DC voltage.

12. An image bar in accordance with claims 1, 2, or 3 wherein said electrochromic material is selected from the group consisting of: phthalocyanines, polymeric materials prepared by an electropolymerization process, and anthraquinones.

13. An imaging apparatus in accordance with claims 4 or 5 wherein said electrochromic material is selected from the group consisting of: phthalocyanines, polymeric materials prepared by an electropolymerization process, and anthraquinones.

14. An image bar in accordance with claims 1, 2, or 3 wherein said electrochromic material is selected from the group consisting of 2(3), 6(7), 10(11), 14(15)-tetratertiarybutyl phthalocyanine, 2(3), 6(7), 10(11), 14(15)-tetrachloro phthalocyanine, bis(phthalocyaninato) neodymium(III), bis(phthalocyaninato) neodymium(IV), bis(phthalocyaninato) lutetium(III), bis(phthalocyaninato) ytterbium(III), 1,4-diamino-2,3-dicyanoanthraquinone, 1,8-diamino-4,5-dihydroxyanthraquinone, 1,4,5,8-tetraaminoanthraquinone, electropolymerized polypyrrole, electropolymerized poly-3-methyl thiophene, and mixtures thereof.

15. An imaging apparatus in accordance with claims 4 or 5 wherein said electrochromic material is selected from the group consisting of 2(3), 6(7), 10(11), 14(15)-tetratertiarybutyl phthalocyanine, 2(3), 6(7), 10(11), 14(15)-tetrachloro phthalocyanine, bis(phthalocyaninato) neodymium(III), bis(phthalocyaninato) neodymium(IV), bis(phthalocyaninato) lutetium(III), bis(phthalocyaninato) ytterbium(III), 1,4-diamino-2,3-dicyanoanthraquinone, 1,8-diamino-4,5-dihydroxyanthraquinone, 1,4,5,8-tetraaminoanthraquinone, electropolymerized polypyrrole, electropolymerized poly-3-methyl thiophene, and mixtures thereof.

16. An image bar in accordance with claims 1, 2, or 3 wherein said thin film is prepared by thermal vacuum evaporation techniques.

17. An imaging apparatus in accordance with claims 4 or 5 wherein said thin film is prepared by thermal vacuum evaporation techniques.

18. An image bar in accordance with claims 1, 2, or 3 wherein said thin film is prepared by Langmuir-Blodgett techniques.

19. An imaging apparatus in accordance with claims 4 or 5 wherein said thin film is prepared by Langmuir-Blodgett techniques.

20. An image bar in accordance with claims 1, 2, or 3 wherein said electrochromic material is selected from the group consisting of bis(phthalocyaninato) neodymium(IV), bis(phthalocyaninato) lutetium(III), 1,4-diamino-2,3-dicyano anthraquinone, 1,4,5,8-tetraamino anthraquinone, electropolymerized polypyrrole, and electropolymerized poly-3-methylthiophene.

21. An imaging apparatus in accordance with claims 4 or 5 wherein said electrochromic material is selected from the group consisting of bis(phthalocyaninato) neodymium(IV), bis(phthalocyaninato) lutetium(III), 1,4-diamino-2,3-dicyano anthraquinone, 1,4,5,8-tetraamino anthraquinone, electropolymerized polypyrrole, and electropolymerized poly-3-methylthiophene.

22. An image bar in accordance with claims 1, 2, or 3 wherein said electrochromic material is selected from the group consisting of tetratertiarybutyl metal-free phthalocyanine, 1,8-diamino-4,5-dihydroxyanthraquinone, 1,8-dinitro-4,5-dihydroxyanthraquinone, and 4,8-dinitro-1,5-dihydroxyanthraquinone, and tetrachloro metal-free phthalocyanine.

23. An imaging apparatus in accordance with claims 4 or 5 wherein said electrochromic material is selected from the group consisting of tetratertiarybutyl metal-free phthalocyanine, 1,8-diamino-4,5-dihydroxyanthraquinone, 1,8-dinitro-4,5-dihydroxyanthraquinone, and 4,8-dinitro-1,5-dihydroxyanthraquinone, and tetrachloro metal-free phthalocyanine.

24. An image bar comprising a linear light valve array with a plurality of discrete, independently addressable pixel portions activatable between light transmitting, partially transmitting, and non-transmitting wavelengths by selective application of an electrical field, wherein said pixel portions consist essentially of, in the order stated, a first transparent substrate;
a transparent electrode in contact with said first transparent substrate and connected to a variable current, variable voltage source;
a thin film comprising an electrochromic material in contact with said transparent electrode;
a transparent electrolytic material in contact with said thin film;
a counterelectrode in contact with said transparent electrolytic material and connected to said variable current, variable voltage source; and
a second substrate.

25. An improved image bar for an imaging apparatus with a photoconductive member, means for pre-charging the photoconductive member prior to the formation of latent electrostatic images, means for developing the latent images, means for transferring the developed images to substrates, and means for cleaning the photoconductive member prior to pre-charging, the image bar containing at least one row of dot shutters which selectively pass light in response to digitized data signals, during the operating mode of the imaging apparatus, to discharge selectively the precharged photoconductive member and thus form the latent images on the photoconductive member line by line, which image bar consists essentially of, in the order stated, a first transparent substrate;

a plurality of transparent electrodes in contact with said first transparent substrate and connected to variable current, variable voltage sources;

a thin film comprising an electrochromic material in contact with said transparent electrode;

a transparent electrolytic material in contact with said thin film;

a counterelectrode in contact with said transparent electrolytic material and connected to the common terminal of said variable current, variable voltage sources; and a second substrate.

26. An image bar comprising a linear light valve array with a plurality of discrete, independently addressable pixel portions activatable between light transmitting, partially transmitting, and non-transmitting wavelengths by selective application of an electric field, consisting essentially of:

a first transparent substrate;

a second substrate;

a plurality of first transparent electrodes;

a second counterelectrode situated between said first and second substrates, such that said first transparent electrodes are situated on said first transparent substrate and said second counterelectrode is situated on said second substrate;

a thin film comprising an electrochromic material, said film being situated on said first transparent electrodes; and an electrolytic material situated between said thin film and said second counterelectrode; wherein said first transparent electrodes are connected to variable current, variable voltage sources and said second counterelectrode is connected to the common terminal of said variable current, variable voltage sources.

27. An imaging apparatus in accordance with claim 4 wherein the image bar consists essentially of, in the order stated, a first transparent substrate, a plurality of transparent electrodes in contact with said first transparent substrate and connected to variable current, variable voltage sources, a thin film comprising an electrochromic material in contact with said transparent electrodes, a transparent electrolytic material in contact with said thin film, a counterelectrode in contact with said transparent electrolytic material and connected to the common terminal of said variable current, variable voltage sources, and a second transparent substrate in contact with said counterelectrode; means for illuminating elements of said array with light; and addressing means for activating predetermined of said array pixels during a line exposure period in accordance with pixel transmission information of a line of the image to be reproduced.

28. An imaging apparatus in accordance with claim 5 wherein the image bar consists essentially of a first transparent substrate, a second substrate, a plurality of first transparent electrodes and a second counterelectrode situated between said first and second substrates, such that said first transparent electrodes are situated on said first transparent substrate and connected to variable current, variable voltage sources, and said second counterelectrode is situated on said second substrate and connected to the common terminal of said variable current, variable voltage sources, a thin film comprising an electrochromic material, said film being situated on said first transparent electrode, and an electrolytic material situated between said thin film and said second counterelectrode.

29. An image bar in accordance with claims 1, 2, or 3 wherein said electrolytic material is a solid material.

30. An image bar in accordance with claims 1, 2, or 3 wherein said electrolytic material is a liquid material.

31. An image bar in accordance with claims 1, 2, or 3 wherein said electrolytic material is selected from the group consisting of $CaF_2$, $ZrO_2$, $Ta_2O_5$, $TiO_2$, $\beta$-$Al_2O_3$, CuI, AgI, KCl, NaCl, $SnO_2$, $In_2O_3$, $Sb_2O_3$, LiF, $MgF_2$, sulfonated polystyrene, and poly(2-acrylamino-2-methyl-1-propanesulfonic)acid, $LiClO_4$, tetrabutyl ammonium perchlorate, tetraethyl ammonium perchlorate, and tetraethyl ammonium tetrafluoborate.

32. An imaging apparatus in accordance with claims 4 or 5 wherein said electrolytic material is a solid material.

33. An imaging apparatus in accordance with claims 4 or 5 wherein said electrolytic material is a liquid material.

34. An imaging apparatus in accordance with claims 4 or 5 wherein said electrolytic material is selected from the group consisting of $CaF_2$, $ZrO_2$, $Ta_2O_5$, $TiO_2$, $\beta$-$Al_2O_3$, CuI, AgI, KCl, NaCl, $SnO_2$, $In_2O_3$, $Sb_2O_3$, LiF, $MgF_2$, sulfonated polystyrene, and poly(2-acrylamino-2-methyl-1-propanesulfonic)acid, $LiClO_4$, tetrabutyl ammonium perchlorate, tetraethyl ammonium perchlorate, and tetraethyl ammonium tetrafluoborate.

35. An image bar in accordance with claims 1, 2, or 3 wherein said thin film comprising an electrochromic material is of a thickness of from about 10 nanometers to less than about 0.1 micron.

36. An imaging apparatus in accordance with claims 4 or 5 wherein said thin film comprising an electrochromic material is of a thickness of from about 10 nanometers to less than about 0.1 micron.

* * * * *